(12) United States Patent
Aragaki

(10) Patent No.: US 10,860,835 B2
(45) Date of Patent: Dec. 8, 2020

(54) IMAGE PROCESSING DEVICE, CELL RECOGNITION DEVICE, CELL RECOGNITION METHOD, AND CELL RECOGNITION PROGRAM

(71) Applicant: OLYMPUS CORPORATION, Tokyo (JP)

(72) Inventor: Hideya Aragaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 130 days.

(21) Appl. No.: 16/112,886

(22) Filed: Aug. 27, 2018

(65) Prior Publication Data

US 2019/0095678 A1    Mar. 28, 2019

(30) Foreign Application Priority Data

Sep. 25, 2017    (JP) .................. 2017-183154

(51) Int. Cl.
| | |
|---|---|
| *G06K 9/00* | (2006.01) |
| *G06T 7/11* | (2017.01) |
| *G06K 9/34* | (2006.01) |
| *G06T 7/00* | (2017.01) |

(Continued)

(52) U.S. Cl.
CPC ....... *G06K 9/0014* (2013.01); *G06K 9/00134* (2013.01); *G06K 9/342* (2013.01);
(Continued)

(58) Field of Classification Search
CPC ......... G06T 7/0014; G06T 7/11; G06T 7/136; G06T 7/187; G06T 7/50; G06T 7/73;
(Continued)

(56) References Cited

U.S. PATENT DOCUMENTS

| | | | | |
|---|---|---|---|---|
| 5,978,497 | A | * | 11/1999 | Lee ..................... G01N 15/1475 382/133 |
| 2004/0114800 | A1 | * | 6/2004 | Ponomarev ........... G06T 7/0012 382/173 |

(Continued)

FOREIGN PATENT DOCUMENTS

| | | |
|---|---|---|
| JP | 2009175334 A | 8/2009 |
| JP | 2013057595 A | 3/2013 |

(Continued)

*Primary Examiner* — Katrina R Fujita
(74) *Attorney, Agent, or Firm* — Scully, Scott, Murphy & Presser, P.C.

(57) ABSTRACT

Provided is an image processing device including: a memory; and a processor comprising hardware, the processor configured to: calculate a feature value; detect, as peak positions, pixel positions the feature value of which are greater than a prescribed feature value threshold value; record the detected peak positions; form, one at a time for the detected peak positions, a cell region; identify a center position of the formed cell region; determine, by using at least one of the peak position, a morphology of the cell region, and the center position of the cell region, a proximity state between the currently formed cell region and a previously formed cell region; and correct, when it is determined that the proximity state is satisfied, at least one of the currently formed cell region and the previously formed cell region.

19 Claims, 16 Drawing Sheets

(51) Int. Cl.
  *G06T 7/187* (2017.01)
  *G06T 7/136* (2017.01)
  *G06T 7/50* (2017.01)
  *G06T 7/73* (2017.01)
  *G06K 9/38* (2006.01)

(52) U.S. Cl.
  CPC .............. *G06K 9/38* (2013.01); *G06T 7/0014* (2013.01); *G06T 7/11* (2017.01); *G06T 7/136* (2017.01); *G06T 7/187* (2017.01); *G06T 7/50* (2017.01); *G06T 7/73* (2017.01); *G06T 2207/10056* (2013.01); *G06T 2207/10064* (2013.01); *G06T 2207/20076* (2013.01); *G06T 2207/20156* (2013.01); *G06T 2207/30024* (2013.01)

(58) Field of Classification Search
  CPC . G06T 2207/10056; G06T 2207/10064; G06T 2207/20076; G06T 2207/20156; G06T 2207/30024; G06K 9/00134; G06K 9/0014; G06K 9/342; G06K 9/38
  See application file for complete search history.

(56) References Cited

U.S. PATENT DOCUMENTS

| | | |
|---|---|---|
| 2009/0213214 A1 | 8/2009 | Yamada |
| 2009/0263002 A1* | 10/2009 | Cremer .................. B82Y 20/00 |
| | | 382/133 |
| 2012/0218379 A1* | 8/2012 | Ozcan .................. G03H 1/0866 |
| | | 348/40 |
| 2013/0064422 A1 | 3/2013 | Ogi |
| 2013/0076897 A1 | 3/2013 | Ogi et al. |
| 2013/0230230 A1* | 9/2013 | Ajemba ............. G06K 9/00147 |
| | | 382/133 |
| 2017/0091948 A1* | 3/2017 | Paradkar .............. G06K 9/4604 |
| 2017/0161545 A1* | 6/2017 | Champlin ............ G06K 9/4652 |

FOREIGN PATENT DOCUMENTS

| | | |
|---|---|---|
| JP | 2013072684 A | 4/2013 |
| WO | 2005057496 A1 | 6/2005 |

* cited by examiner

IMAGE PROCESSING DEVICE, CELL RECOGNITION DEVICE, CELL RECOGNITION METHOD, AND CELL RECOGNITION PROGRAM

CROSS-REFERENCE TO RELATED APPLICATIONS

This application claims the benefit of Japanese Patent Application No. 2017-183154, the content of which is incorporated herein by reference.

TECHNICAL FIELD

The present invention relates to an image processing device, a cell recognition device, a cell recognition method, and a cell recognition program for extracting individual cells from a cell image obtained by acquiring an image with, for example, a fluorescence microscope.

BACKGROUND ART

In the fields of medicine and life science, various cell analyses have been carried out using cell images acquired with a microscope. In research on stem cells, such as Embryonic Stem Cells (ES cells) and Induced Pluripotent Stem Cells (iPS cells), in order to elucidate the cell differentiation mechanism, develop new drugs, and so forth, the work of observing the cell differentiation process and changes in cell morphological features, examining the differences in properties among cells, and so forth is generally carried out using a plurality of cell images that have been acquired time-sequentially. In addition, regarding cell image analysis, it is also becoming possible to automate cumbersome work that has so far been carried out via visual observation, such as screening of individual cells, by applying image analysis techniques including image recognition.

Furthermore, for the purpose of, for example, studying the effects of, for example, drugs in an environment that more closely approximates the environment in a living body, it is becoming possible to grow a three-dimensional culture in which cells are cultured in the form of a three-dimensional object, and to three-dimensionally analyze the culture state of a cell cluster composed of a plurality of three-dimensionally aggregated cells by applying image analysis techniques (refer to, for example, Patent Literature 1). With the application of such image processing techniques, information on cell morphologies, the number of individual cells, and so forth can be recognized efficiently by automatically detecting individual cells included in a cell image.

Patent Literature 1 discloses a method for calculating a score, representing a prescribed feature value, for each pixel in a cell image on the basis of the pixel values in a prescribed region including that pixel, placing an exclusive region, representing a region identical or proximate to the prescribed region, for each pixel at the position of that pixel in descending order of the pixel score, and detecting one of the thus-placed exclusive regions as an object of interest.

CITATION LIST

Patent Literature

{PTL 1}
PCT International Publication No. WO 2005/057496

SUMMARY OF INVENTION

One aspect of the present invention is an image processing device including: a memory; and a processor comprising hardware, the processor configured to: calculate a feature value, the feature value representing how likely a pixel value in each of pixels in a cell image formed by capturing an image of a cell cluster composed of a plurality of cells is to be an extreme value; detect, as peak positions, pixel positions the feature value of which are greater than a prescribed feature value threshold value in the cell image; record the detected peak positions in the memory; form, one at a time for the recorded peak positions recorded in the memory, a cell region on the basis of a distribution of the pixel values of a plurality of pixels included in a region peripheral to the peak position in the cell image; identify a center position of the formed cell region; determine, by using at least one of the peak position, a morphology of the cell region, and the center position of the cell region, a proximity state between the currently formed cell region and a previously formed cell region; and correct, when it is determined that the proximity state is satisfied, at least one of the currently formed cell region and the previously formed cell region.

Another aspect of the present invention is a cell recognition device including: an image acquisition device that is configured to acquire a cell image formed by capturing an image of a cell cluster composed of a plurality of cells; and an image processing device that includes a memory and a processor, the processor configured to: calculate a feature value, the feature value representing how likely a pixel value in each of pixels in the cell image acquired by the image acquisition device is to be an extreme value; detect, as peak positions, pixel positions the feature value of which are greater than a prescribed feature value threshold value in the cell image; record the detected peak positions in the memory; form, one at a time for the recorded peak positions recorded in the memory, a cell region on the basis of a distribution of the pixel values of a plurality of pixels included in a region peripheral to the peak position in the cell image; identify a center position of the formed cell region; determine, by using at least one of the peak position, a morphology of the cell region, and the center position of the cell region, a proximity state between the currently formed cell region and a previously formed cell region; and correct, when it is determined that the proximity state is satisfied, at least one of the currently formed cell region and the previously formed cell region.

Another aspect of the present invention is a cell recognition method including: calculating a feature value, the feature value representing how likely a pixel value in each of pixels in a cell image formed by capturing an image of a cell cluster composed of a plurality of cells is to be an extreme value; detecting, as peak positions, pixel positions the feature value of which are greater than a prescribed feature value threshold value in the cell image and recording the detected peak positions; forming, one at a time for the recorded peak positions, a cell region on the basis of a distribution of the pixel values of a plurality of pixels included in a region peripheral to the peak position in the cell image; identifying a center position of the formed cell region; determining, by using at least one of the peak position, a morphology of the cell region, and the center position of the cell region, a proximity state between the currently formed cell region and a previously formed cell region; and correcting, when it is determined that the proximity state is satisfied, at least one of the currently formed cell region and the previously formed cell region.

Another aspect of the present invention is a non-transitory computer-readable medium having a cell recognition program stored thereon, the cell recognition program causing a computer to execute functions of: calculating a feature value, the feature value representing how likely a pixel value in each of pixels in a cell image formed by capturing an image of a cell cluster composed of a plurality of cells is to be an extreme value; detecting, as peak positions, pixel positions the feature value of which are greater than a prescribed feature value threshold value in the cell image and recording the peak positions; forming, one at a time for the recorded peak positions, a cell region on the basis of a distribution of the pixel values of a plurality of pixels included in a region peripheral to the peak position in the cell image; identifying a center position of the formed cell region; determining, by using at least one of the peak position, a morphology of the cell region, and the center position of the cell region, a proximity state between the currently formed cell region and a previously formed cell region; and correcting, when it is determined that the proximity state is satisfied, at least one of the currently formed cell region and the previously formed cell region.

DESCRIPTION OF EMBODIMENTS

First Embodiment

An image processing device, a cell recognition device, and a cell recognition method according to a first embodiment of the present invention will now be described with reference to the drawings.

Figure 1:
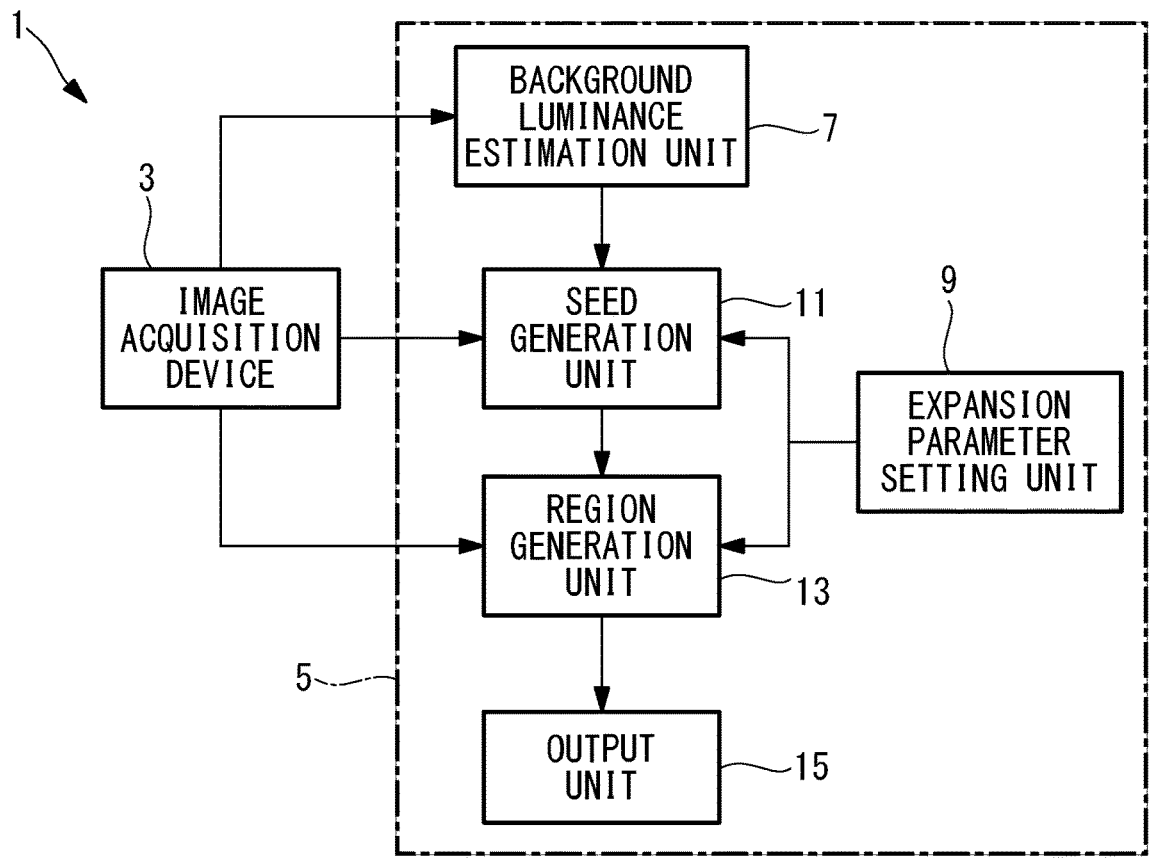
FIG. 1 is a block diagram showing the configuration of a cell recognition device according to a first embodiment of the present invention.

As shown in FIG. 1, a cell recognition device 1 according to this embodiment includes: an image acquisition device (image acquisition unit) 3 that acquires a cell image by capturing an image of a cell cluster composed of a plurality of cells; and an image processing device 5 for processing the cell image acquired by the image acquisition device 3.

The image acquisition device 3 includes: an image capturing element, such as a CCD, for acquiring an image of cells captured with a fluorescence microscope; and an A/D converter for converting, into a digital signal, the cell image acquired by the image capturing element (neither is shown in the figure), and the image acquisition device 3 outputs, for example, a 16-bit (0 to 65535 gradations) raw image signal.

In addition, the image acquisition device 3 is configured to be capable of acquiring a plurality of images at preset intervals in the vertical direction and outputting, as a raw image signal, three-dimensional Z-stack image data composed of a set of the images. In the following description, the vertical direction is assumed to be the Z direction, and the horizontal directions that are orthogonal to the Z direction and that are orthogonal to each other are assumed to be the X direction and the Y direction, respectively.

Figure 2:
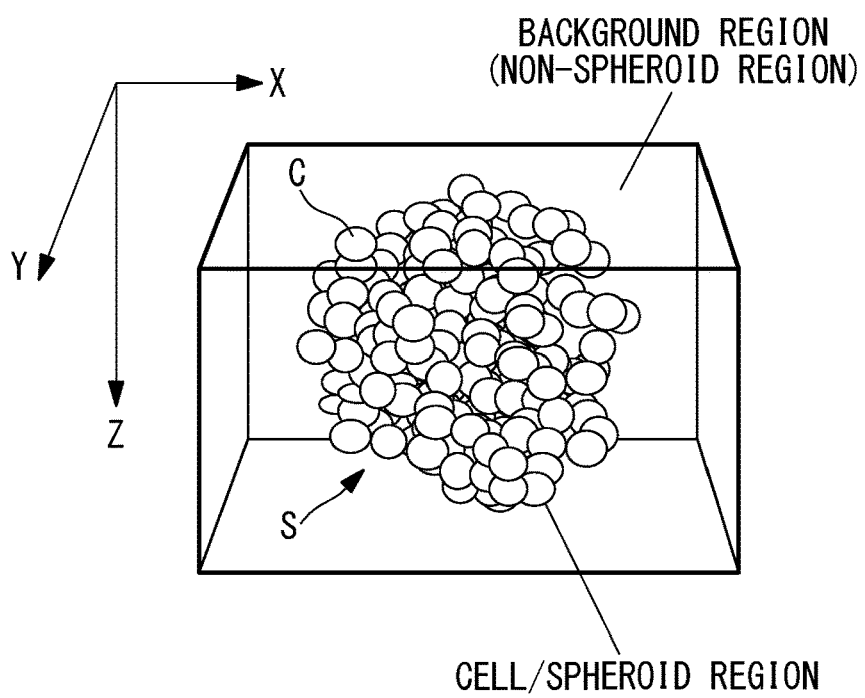
FIG. 2 is a diagram depicting one example of a spheroid in which cells aggregate in the form of a three-dimensional agglomerate.
Figure 3A:
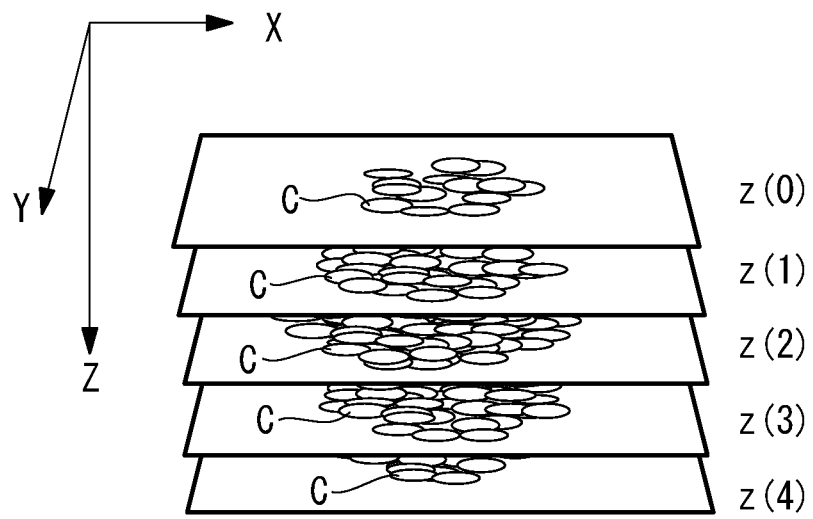
FIG. 3A is a diagram depicting one example of Z-stack image data composed of a set of spheroid images that have been acquired at prescribed intervals.
Figure 3B:
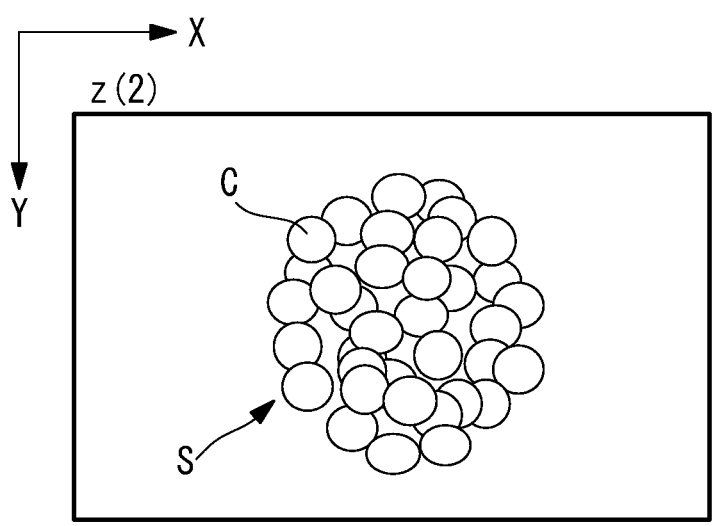
FIG. 3B is a diagram depicting a cross-sectional (slice) image at Z=z(2) in the Z-stack image data in FIG. 3A.

FIG. 2 shows a spheroid S serving as one example of the cell cluster in which cells C aggregate three-dimensionally in the form of an agglomerate. In addition, FIG. 3A shows one example of the Z-stack image data composed of a set of images of the spheroid S acquired at prescribed intervals, and FIG. 3B shows one example of a cross-sectional (slice) image, corresponding to the depth Z=z(2), included in the Z-stack image data. The raw image signal output from the image acquisition device 3 is transferred to the image processing device 5.

As shown in FIG. 1, the image processing device 5 includes: a background luminance estimation unit 7; an expansion parameter setting unit (setting unit) 9; a seed generation unit 11; a region generation unit (cell region formation unit) 13; and an output unit 15. Each of these processing units is connected to a system controller, not shown in the figure, so that the operation thereof is controlled. In addition, each of these processing units may be composed of, for example, a central processing unit (CPU) and a storage device, such as a random access memory (RAM) or a read only memory (ROM), for storing an arithmetic operation program. In this case, it is advisable that the ROM store a cell recognition program serving as the arithmetic operation program.

For the image of the raw image signal sent from the image acquisition device 3, the background luminance estimation unit 7 estimates the mean luminance value of the pixels (corresponding to voxels in the case of a three-dimensional image) belonging to a background region, which is a non-spheroid region, as shown in FIG. 2, not including the spheroid S, cells C, and so forth to be recognized.

Figure 4:
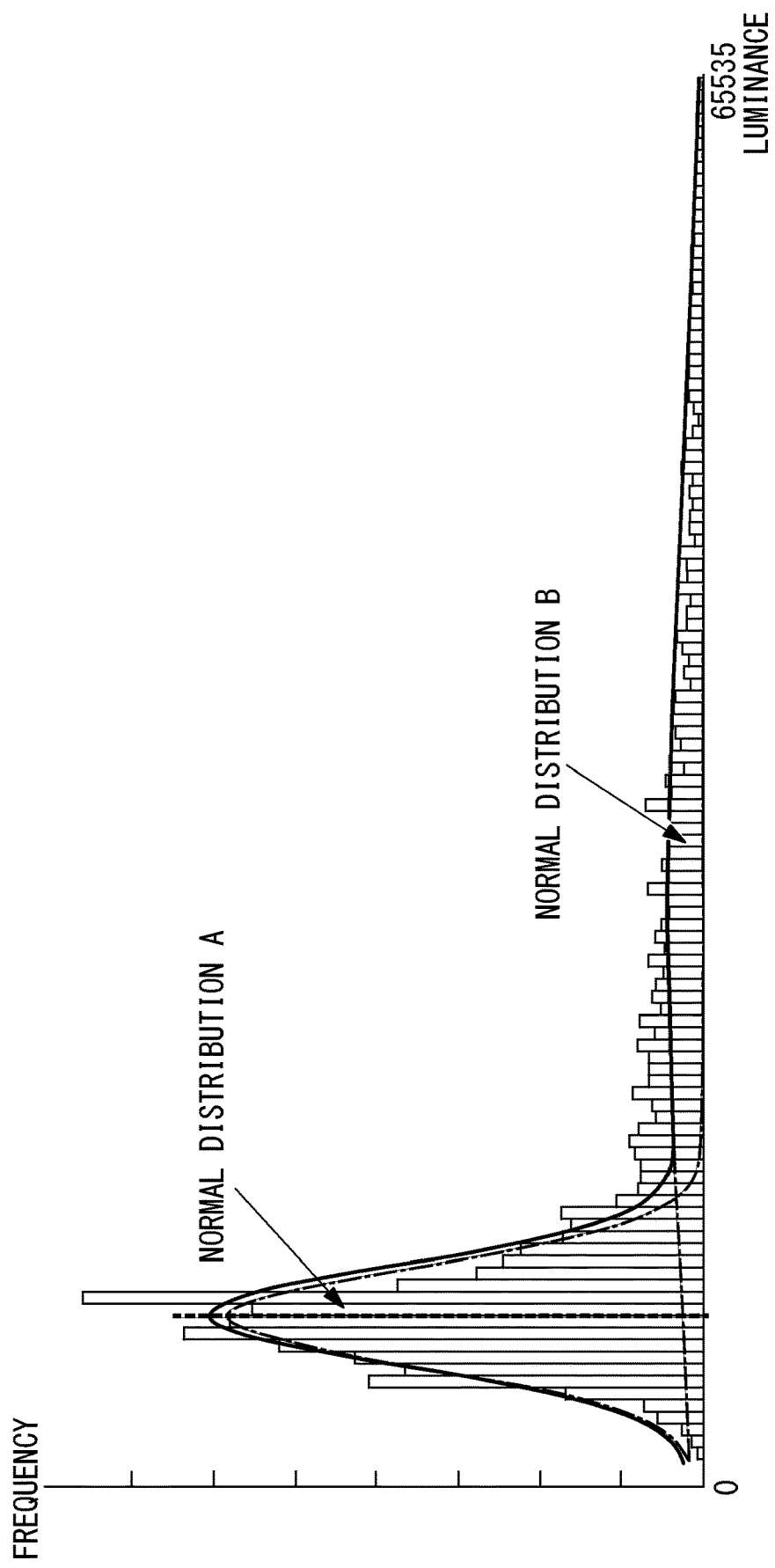
FIG. 4 is a diagram depicting an example of fitting a luminance histogram to a mixture normal distribution.

More specifically, the background luminance estimation unit 7 first generates a luminance histogram, as shown in FIG. 4, on the basis of the luminance value of each pixel from the raw image signal. In FIG. 4, the horizontal axis indicates the luminance, and the vertical axis indicates the pixel frequency. The luminance values of the pixels belonging to the background are likely to be localized in a certain luminance width, and the histogram can be regarded as a mixture distribution in which a sharp normal distribution A, composed of pixels belonging to the background, and a flat normal distribution B, composed of pixels belonging to the spheroid S, are mixed.

For this reason, as shown in FIG. 4, the background luminance estimation unit 7 performs fitting of the luminance histogram using known fitting processing based on the weighted addition of the two normal distributions A and B, namely, a mixture normal distribution. As the known fitting processing, any processing, such as the expectation-maximization algorithm (EM algorithm), can be applied.

In addition, the background luminance estimation unit 7 is configured to estimate, as the background luminance, the parameter mean value in the apparently sharper normal distribution (normal distribution A in FIG. 4) of the fitted bimodal mixture normal distribution. The background luminance value estimated by the background luminance estimation unit 7 is transferred to the seed generation unit 11.

The expansion parameter setting unit 9 allows a user to enter and set an apparent Z-direction expansion rate for the morphologies of the cells C in the cell image.

Figure 5:
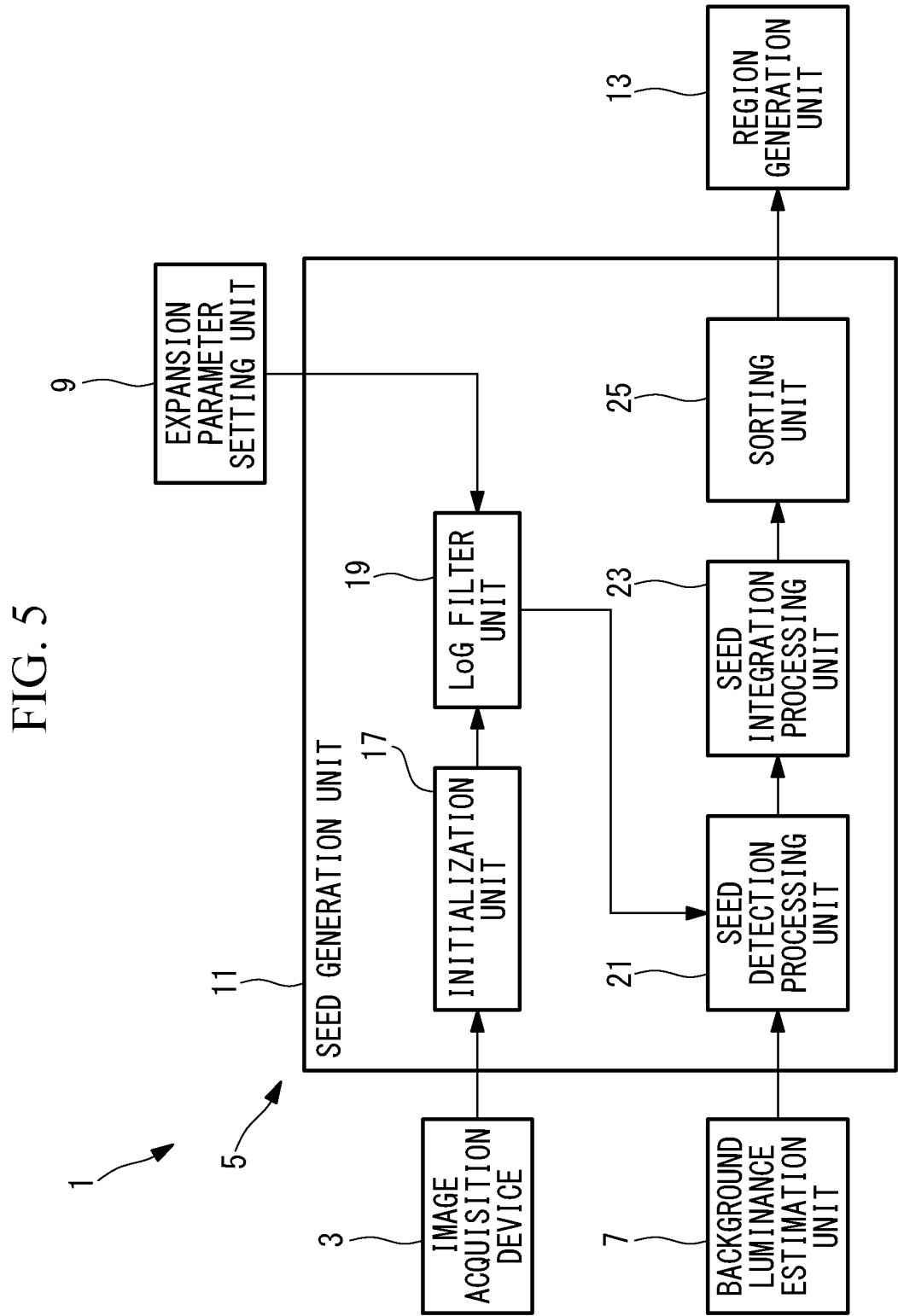
FIG. 5 is a block diagram showing a specific configuration of a seed generation unit in FIG. 1.

In the seed generation unit 11, information about a group of coordinates of potential cell positions, which are highly likely to correspond to the center positions of the individual cells C, in the raw image signal acquired by the image acquisition device 3 is generated as seed information. As shown in FIG. 5, this seed generation unit 11 includes: an initialization unit 17; a LoG filter unit (feature value calculation unit) 19; a seed detection processing unit (peak position detection unit) 21; a seed integration processing unit 23; and a sorting unit 25.

The initialization unit 17 reads the raw image signal sent from the image acquisition device 3 and initializes (normalizes) the luminance value of each pixel to a 12-bit range. In other words, the initialization unit 17 adjusts the gradation width to the range of 0 to 4095. More specifically, the initialization unit 17 obtains a maximum pixel value max in the raw image signal and then multiplies each pixel value by Gain (=4095/max). The raw image signal initialized by the initialization unit 17 is transferred to the LoG filter unit 19.

The LoG filter unit 19 applies a Laplacian-of-Gaussian filter (LoG filter) to the raw image signal initialized by the initialization unit 17. The LoG filter is represented as a filter having the effects of a Gaussian filter (smoothing filter) and a Laplacian filter (quadratic differential (edge detection) filter) combined.

An example of a two-dimensional LoG filter is shown below.

$$\mathrm{LoG}(x,y) = (x^2+y^2-2\sigma^2)/(2\pi\sigma^6) \times \exp\{-(x^2+y^2)/(2\sigma^2)\}$$

Here, x and y represent a pixel position, LoG(x, y) represents a filter output value (feature value, referred to hereinafter as a LoG output value), and σ represents a parameter for adjusting the filter effect.

In the cell image, the cells C are often represented as "bright spots" having a higher luminance than the peripheries thereof, and nowadays, the LoG filter is often used to detect the luminance peak position=cell position. The LoG filter unit 19 applies the two-dimensional LoG filter to the (two-dimensional) slice plane image at each Z position of the initialized raw image signal, obtains an LoG output value (feature value) for each pixel, which represents how likely the pixel value is to be an extreme value, and generates an LoG output value image in which these values are recorded as pixel values. The LoG output value image generated by the LoG filter unit 19 is transferred to the seed detection processing unit 21.

Here, the two-dimensional LoG filter is applied to each of the Z slice plane images. Instead of this, the LoG output value may be obtained by applying a three-dimensional LoG filter directly to each pixel of the three-dimensional Z-stack image. In this case, due to, for example, low resolution in the Z direction, depending on an optical system condition, such as the point spread function (PSF), of the image acquisition device 3 or the state of the cell cluster serving as a subject, the individual cells C may appear to be expanded in the Z direction in the acquired image, as shown in, for example, FIG. 6.

As a measure against this, the LoG filter unit 19 may be adjusted on the basis of the Z-direction expansion rate set by the user in the expansion parameter setting unit 9 so that the LoG filter is applied more strongly in the Z direction. In addition, the LoG filter unit 19 may calculate LoG output values from pixel values included in a region in a prescribed range that has been set on the basis of an optical system condition, such as the PSF, of the image acquisition device 3. By doing so, in a case where, for example, the individual cells appear to be expanded as a result of blurring taking place in the cell image due to image quality deterioration, such as low optical performance, during image acquisition, the LoG output values can be calculated with this expansion being taken into account.

On the basis of the LoG output value image sent from the LoG filter unit 19, the seed detection processing unit 21 detects peak pixel positions (peak positions) indicating local maximum LoG output values. More specifically, the seed detection processing unit 21 two-dimensionally scans the (two-dimensional) slice plane image at each Z position of the LoG output value image and detects a peak pixel position the LoG output value of which is higher than the values of peripheral pixels (prescribed feature value threshold value) neighboring the peak pixel position. Thereafter, the seed detection processing unit 21 outputs, as the seed information, position coordinate information (seed coordinates represented with XZY coordinate values) of the detected peak pixel position and the LoG output value at that peak pixel position.

In addition, just in case minute luminance irregularities in the background may be erroneously detected as seeds (peak positions), the seed detection processing unit 21 applies threshold value processing to the luminance value of the pixel, on the raw image signal, corresponding to each set of the seed coordinates by using a pixel threshold value that has been set for luminance on the basis of the background luminance value estimated by the background luminance estimation unit 7, thereby deleting seed information if the luminance value thereof is equal to or less than a certain luminance value. By doing so, noise that has been erroneously detected as peak pixel positions can be eliminated. The seed information detected by the seed detection processing unit 21 is transferred to the seed integration processing unit 23. Here, the peak pixel positions are obtained two-dimensionally. Instead of this, three-dimensional peak pixel positions, including positions in the Z direction, may be obtained.

Regarding the seed coordinates included in the plurality of items of seed information sent from the seed detection processing unit 21, the seed integration processing unit 23 integrates any two sets of seed coordinates that are very close to each other with respect to the mean size of the cells C.

More specifically, the seed integration processing unit 23 first takes out the sets of seed coordinates from two items of seed information and calculates the spatial distance between the sets of seed coordinates. The seed integration processing unit 23 then uses a proximity threshold value that is preset on the basis of the mean cell size (cell radius) and integrates the two sets of seed coordinates the spatial distance between which is equal to or less than the proximity threshold value, in other words, the two sets of seed coordinates determined as sets of coordinates of two seeds (peak positions) that are sufficiently proximate to each other compared with the cell size.

The integration of seed coordinates is performed such that the LoG output value is compared between the two peak pixel positions corresponding to two neighboring sets of seed coordinates, and the set of seed coordinates having a larger LoG output value are kept, whereas the other set of seed coordinates are discarded, assuming that the peak pixel position having the larger LoG output value is more likely to be a seed (closer to the center position of a cell C). The seed integration processing unit 23 exhaustively searches all items of seed information for adjacent sets of seed coordinates, repeats this processing until there are no other sets of seed coordinates to be integrated, and transfers the kept seed information to the sorting unit 25.

The sorting unit 25 refers to each of the LoG output values in the seed information sent from the seed integration processing unit 23 and arranges (sorts) these items of seed information in descending order of the LoG output value. The larger the LoG output value, the more likely that the LoG output value indicates a cell C, and hence, by doing so, cell regions can be sequentially formed in a more efficient manner, starting with the seed information having the largest LoG output value. The seed information sorted by the sorting unit 25 is transferred to the region generation unit 13.

In the region generation unit 13, each set of the seed coordinates is selected on the basis of the seed information generated by the seed generation unit 11 in the order that the seed coordinates are sorted in descending order of the LoG output value, and individual cell regions are formed for all the selected sets of seed coordinates on the basis of the distribution of the luminance values of pixels peripheral to each of the sets of seed coordinates.

Figure 7:
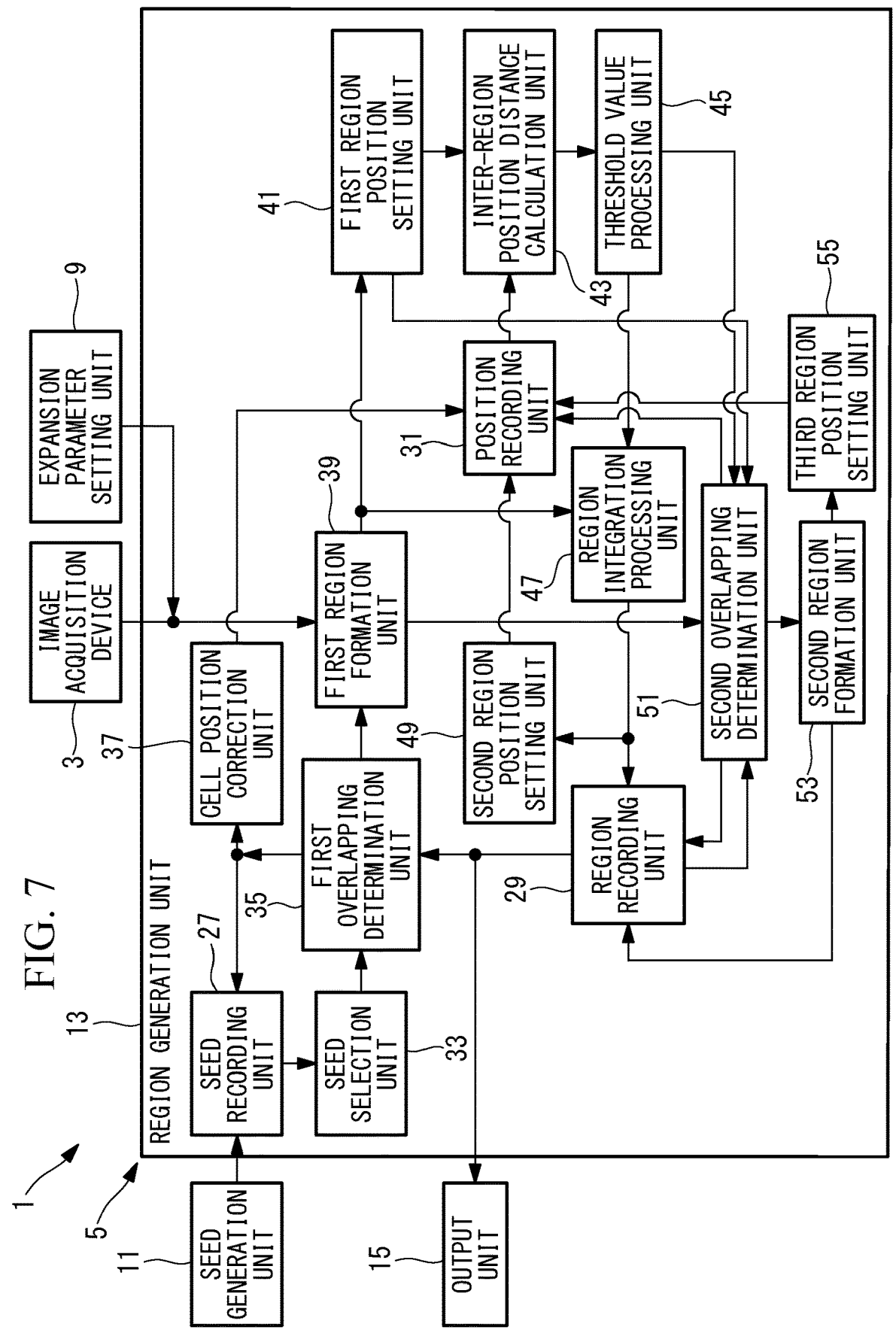
FIG. 7 is a block diagram showing a specific configuration of a region generation unit in FIG. 1.

As shown in FIG. 7, this region generation unit 13 includes a seed recording unit (peak position recording unit) 27, a region recording unit 29, a position recording unit 31, a seed selection unit 33, a first overlapping determination unit (proximity state determination unit) 35, a cell position correction unit (first correction unit) 37, a first region formation unit (cell region formation unit) 39, a first region position setting unit (cell region position identification unit) 41, an inter-region position distance calculation unit 43, a threshold value processing unit (proximity state determination unit) 45, a region integration processing unit (cell region formation unit, second correction unit) 47, a second region position setting unit (cell region position identification unit) 49, a second overlapping determination unit (proximity state determination unit) 51, a second region formation unit (cell region formation unit, third correction unit) 53, and a third region position setting unit (cell region position identification unit) 55.

The seed recording unit 27 functions as a buffer memory for temporarily recording the seed information sent from the seed generation unit 11. In the seed recording unit 27, seed information that is recorded in a series of region generation steps is updated as needed. In addition, the seed recording unit 27 deletes recorded seed information according to the determination result from the first overlapping determination unit 35.

The region recording unit 29 functions as a buffer memory of the same size as that of the raw image signal, the buffer memory being used to record interim results of region generation during a series of procedures for generating cell regions for individual sets of seed coordinates. In the region recording unit 29, the generated cell regions are recorded in the buffer and updated, as needed. In addition, when region generation for all sets of seed coordinates is finished, the region recording unit 29 records a cell region division image in which individual cell regions are delimited, and then the result of the cell region division is transferred to the output unit 15.

The position recording unit 31 functions as a buffer memory for temporarily recording the center position of each of the cell regions recorded in the region recording unit 29. In the position recording unit 31, the cell regions recorded in a series of region generation steps are updated as needed.

The seed selection unit 33 selects sets of seed coordinates included in the seed information recorded in the seed recording unit 27, one at a time, in the sorted order and transfers them to the first overlapping determination unit 35.

Figure 8A:
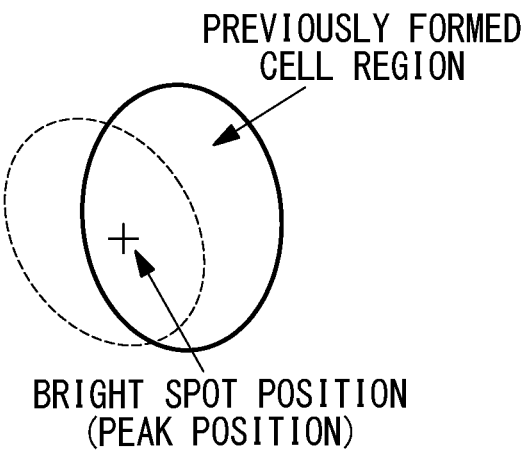
FIG. 8A is a diagram showing one example of a situation in which a currently formed cell region, which is very close to a previously formed cell region, is deleted.

On the basis of the seed coordinates of the currently formed cell region that are sent by the seed selection unit 33 and information about a previously formed cell region recorded in the region recording unit 29, the first overlapping determination unit 35 determines whether or not there is an overlapping cell region, as shown in FIG. 8A. More specifically, the first overlapping determination unit 35 determines whether or not the distance between the set of seed coordinates sent by the seed selection unit 33 and the set of seed coordinates of the cell region recorded in the region recording unit 29 is equal to or less than a prescribed peak threshold value.

When the first overlapping determination unit 35 determines that this distance is equal to or less than the prescribed peak threshold value, the information about the seed coordinates of the currently formed cell region is sent to the seed recording unit 27, and furthermore the information about the seed coordinates, as well as the information about the previously formed overlapping cell region, are sent to the cell position correction unit 37. In this case, in the seed recording unit 27, the seed information corresponding to the information about seed coordinates that has been sent from the first overlapping determination unit 35 is deleted from the record. By doing so, it is not necessary to form a cell region redundantly for a set of seed coordinates adjacent to a set of seed coordinates for which a cell region has already formed, and furthermore, the seed recording unit 27 does not need to redundantly record such seed information.

On the other hand, when the first overlapping determination unit 35 determines that the distance is larger than the prescribed peak threshold value (does not overlap), the information about the seed coordinates of that currently formed cell region is transferred to the first region formation unit 39.

On the basis of information about the seed coordinates sent from the first overlapping determination unit 35 and information about the previously formed overlapping cell region, the cell position correction unit 37 searches for the center position of the previously formed overlapping cell region, said center position being recorded in the position recording unit 31.

Thereafter, the cell position correction unit 37 corrects the seed coordinate values of the previously formed overlapping cell region, said seed coordinate values being recorded in the position recording unit 31, by shifting, by a prescribed amount, the found center position towards those seed coordinates sent from the first overlapping determination unit 35, and ends processing on the seed (seed information) for which a region is currently formed. For example, when the set of coordinates of the center position before correction is referred to as Pold and the set of seed coordinates is referred to as Pseed, the mid coordinates (Pold+Pseed)/2 may be assigned to the coordinates of the center position, after correction, as Pnew.

The first region formation unit 39 forms a cell region on the basis of a spatial distribution of pixel values peripheral to the set of seed coordinates sent from the first overlapping determination unit 35. More specifically, in response to the raw image signal sent from the image acquisition device 3, the first region formation unit 39 first trims a region in a prescribed range centered on the set of seed coordinates sent from the first overlapping determination unit 35. The size of the trimming region is specified on the basis of the above-described cell radius.

Figure 6:
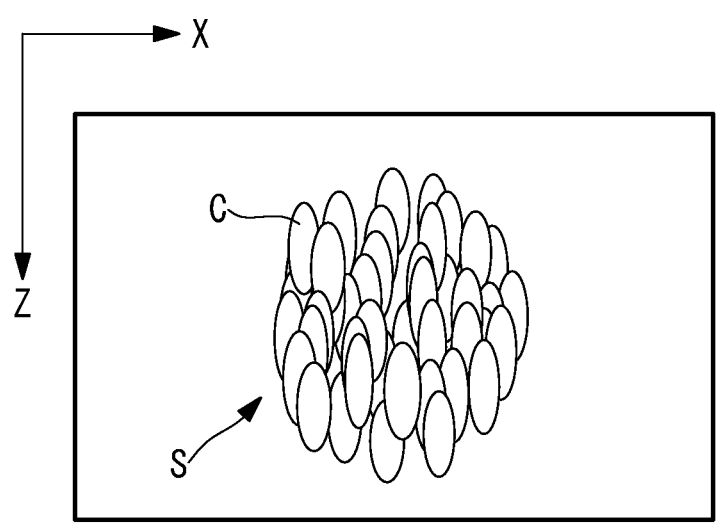
FIG. 6 is a diagram showing one example of a spheroid in which individual cells appear to be expanded as a result of blurring taking place in the Z direction.

In this case, due to, for example, low resolution in the Z direction, depending on an optical system condition, such as the point spread function (PSF), of the image acquisition device 3 or the state of the cell cluster serving as a subject, the individual cells C may appear to be expanded in the Z direction in the acquired image, as shown in FIG. 6. In that case, the first region formation unit 39 adjusts the trimming range so as to be expanded in the Z direction on the basis of the Z-direction expansion rate entered by the user in the expansion parameter setting unit 9.

In addition, the first region formation unit 39 generates a smoothed region the border of which is smoothed by applying a smoothing filter to the trimming region. Thereafter, the first region formation unit 39 obtains edge strengths, defined by luminance gradient, of pixels that are away from the center of the smoothed region by more than the cell radius and that are in the smoothed region and performs the correction process of replacing the pixel values of pixels having an edge strength lower than a prescribed threshold value with the above-described background luminance value.

Here, the luminance gradient is calculated from the inner product PV·GV between a direction vector PV, obtained by normalizing the position vector of a pixel with the origin adjusted to the center of the smoothed region, and a gradient vector GV calculated from the difference (gradient) in luminance value from the neighboring pixel. In addition, the magnitude of the edge strength threshold value for a pixel may be adjusted according to the distance from the center of the smoothed region to the pixel, like threshold value THedge=0 (distance<cell size), THedge=coef×(Dist−cell size) (distance≥cell size), where coef is a prescribed constant.

The first region formation unit 39 forms a cell region by binarizing the smoothed region, in which the pixel values have been corrected as described above (correction based on weighted edge strength on each pixel value), with reference to an adaptive threshold value (binarized threshold value) based on the distribution of the pixel values in the region. The adaptive threshold value may be reset if it is smaller, by a prescribed amount or more, than the maximum value of the pixel values of a plurality of pixels included in a region peripheral to the peak pixel position. By doing so, the adaptivity of the adaptive threshold value is enhanced, thereby making it possible to form a cell region with higher accuracy. In addition, the first region formation unit 39 may set a pixel range peripheral to the set of seed coordinates on the basis of the LoG output value of the peak pixel position.

In addition, just in case there is a hole in the cell region formed via binarization, the first region formation unit 39 also functions as a hole filling processing unit for filling the hole in the cell region by applying hole filling processing. Hole filling processing can make the distribution of the cell regions easier to understand. In addition, the first region formation unit 39 also functions as a fragment-region removing unit that, if a cell region fragmented into a plurality of regions is formed, keeps the region closest to the peak pixel position and discards regions not including the center position. This is necessary for a case where fragmented regions of a neighboring cell C may be erroneously detected as cell regions at positions away from the center during binarization. The cell region formed by the first region formation unit 39 is transferred to the first region position setting unit 41, the region integration processing unit 47, and the second overlapping determination unit 51.

The first region position setting unit 41 calculates the center position of the cell region sent from the first region formation unit 39, sets the calculated center position as the region position, and transfers it to the inter-region position distance calculation unit 43 and the second overlapping determination unit 51.

The inter-region position distance calculation unit 43 refers to the center position (region position) of a previously formed cell region recorded in the position recording unit 31, calculates the distance from the center position of the previously formed cell region to the region position (center position of the cell region) sent from the first region position setting unit 41, and transfers it to the threshold value processing unit 45.

The threshold value processing unit 45 compares the distance calculated by the inter-region position distance calculation unit 43 with a prescribed inter-center position threshold value and transfers the comparison result to the region integration processing unit 47 and the second overlapping determination unit 51. The prescribed inter-center position threshold value needs to be larger than the prescribed peak position threshold value and is set on the basis of, for example, the LoG output value of the corresponding peak pixel position in the cell region.

When the threshold value processing unit 45 determines that the distance is equal to or less than the prescribed inter-center position threshold value, the region integration processing unit 47 integrates these cell regions into one cell region. This can prevent delimitation of cell regions from becoming too complicated and difficult to understand because cell regions whose respective sets of seed coordinates are away from each other by more than the prescribed peak threshold value but that are so close to each other that the distance between the respective region positions is equal to or less than the prescribed inter-center position threshold value are difficult to delimit and, in some cases, a large portion of one cell region is hidden by another cell region.

Figure 8B:
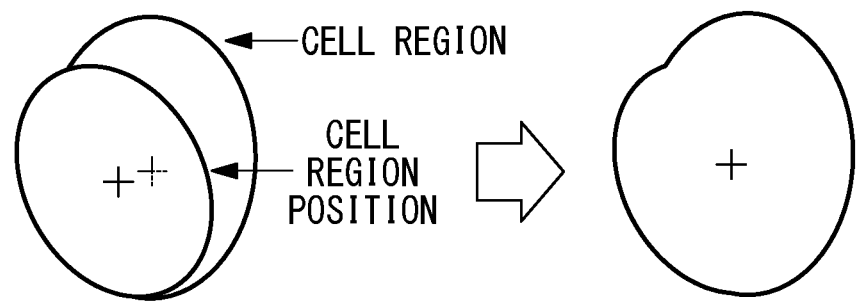
FIG. 8B is a diagram depicting one example of a situation in which a previously formed cell region and a currently formed cell region, which largely overlaps the previously formed cell region, are integrated.

More specifically, as shown in FIG. 8B, the region integration processing unit 47 forms a new cell region by integrating the cell region formed by the first region formation unit 39 with an existing proximate cell region. The cell region formed by the region integration processing unit 47 is transferred to the region recording unit 29 and the second region position setting unit 49, and processing on the seed (seed information) ends.

The second region position setting unit 49 calculates the center position of the cell region sent from the region integration processing unit 47, sets the calculated center position as the region position, and transfers it to the position recording unit 31.

When the threshold value processing unit 45 determines that the distance is greater than the prescribed inter-center position threshold value, the second overlapping determination unit 51 determines whether or not a previously formed cell region recorded in the region recording unit 29 overlaps the region position (center position of the cell region) sent from the first region position setting unit 41.

When the second overlapping determination unit 51 determines that the region position sent from the first region position setting unit 41 is not disposed so as to overlap the previously formed cell region, the cell region at that region position sent from the first region formation unit 39 is transferred to and recorded in the region recording unit 29, that region position is transferred to and recorded in the position recording unit 31, and processing on that seed (seed information) ends.

On the other hand, when the second overlapping determination unit 51 determines that the region position sent from the first region position setting unit 41 is disposed so as to overlap the previously formed cell region, the cell region at that region position sent from the first region formation unit 39 and the previously formed overlapping cell region are transferred to the second region formation unit 53.

Figure 8C:
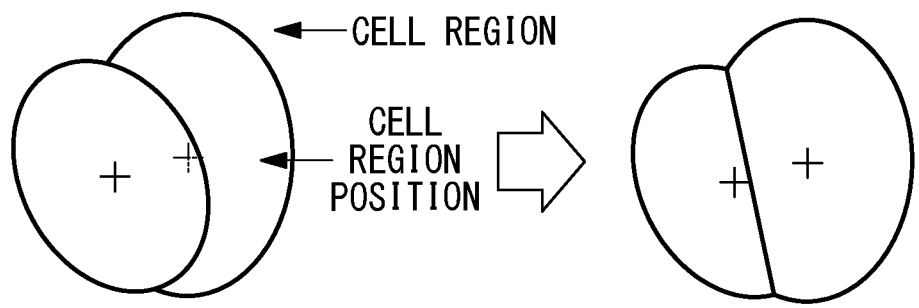
FIG. 8C is a diagram showing one example of a situation in which a previously formed cell region and a currently formed cell region, which slightly overlaps the previously formed cell region, are separated from each other and are re-formed or formed.

As shown in FIG. 8C, the second region formation unit 53 re-forms the two cell regions so as to be restricted to the region occupied by the two overlapping cell regions sent from the second overlapping determination unit 51. Cell regions in which the respective sets of seed coordinates are away from each other by more than the prescribed peak threshold value and the region positions are also away from each other by more than the prescribed inter-center position threshold value but in which the region position of one cell region overlaps the other cell region have a sufficiently large non-overlapping region, and hence such cell regions neighboring each other can be displayed so as to be delimited in the manner as described above. Although a known region division method may be used to re-form the cell region, a region division method based on the relatively convenient region growing method is applied in this example to re-form the cell region.

More specifically, the second region formation unit 53 arranges, in the region occupied by the two cell regions, new initial regions of a prescribed size, representing two cells C, applies the region growing method to each of the initial regions to allow each of the regions to grow, and splits the region into two cell regions again, thus re-forming each of the cell regions. The two initial regions are spherical regions the sizes of which are adjusted so that the regions do not overlap each other. The two cell regions re-formed by the second region formation unit 53 are transferred to and recorded in the region recording unit 29 and are also transferred to the third region position setting unit 55.

The third region position setting unit 55 calculates the center position of each of the two re-formed cell regions sent from the second region formation unit 53, sets each of the calculated center positions as the corresponding region position, and transfers it to the position recording unit 31.

The output unit 15 outputs the final result of the cell region division.

Next, the cell recognition method according to this embodiment will be described.

Figure 9:
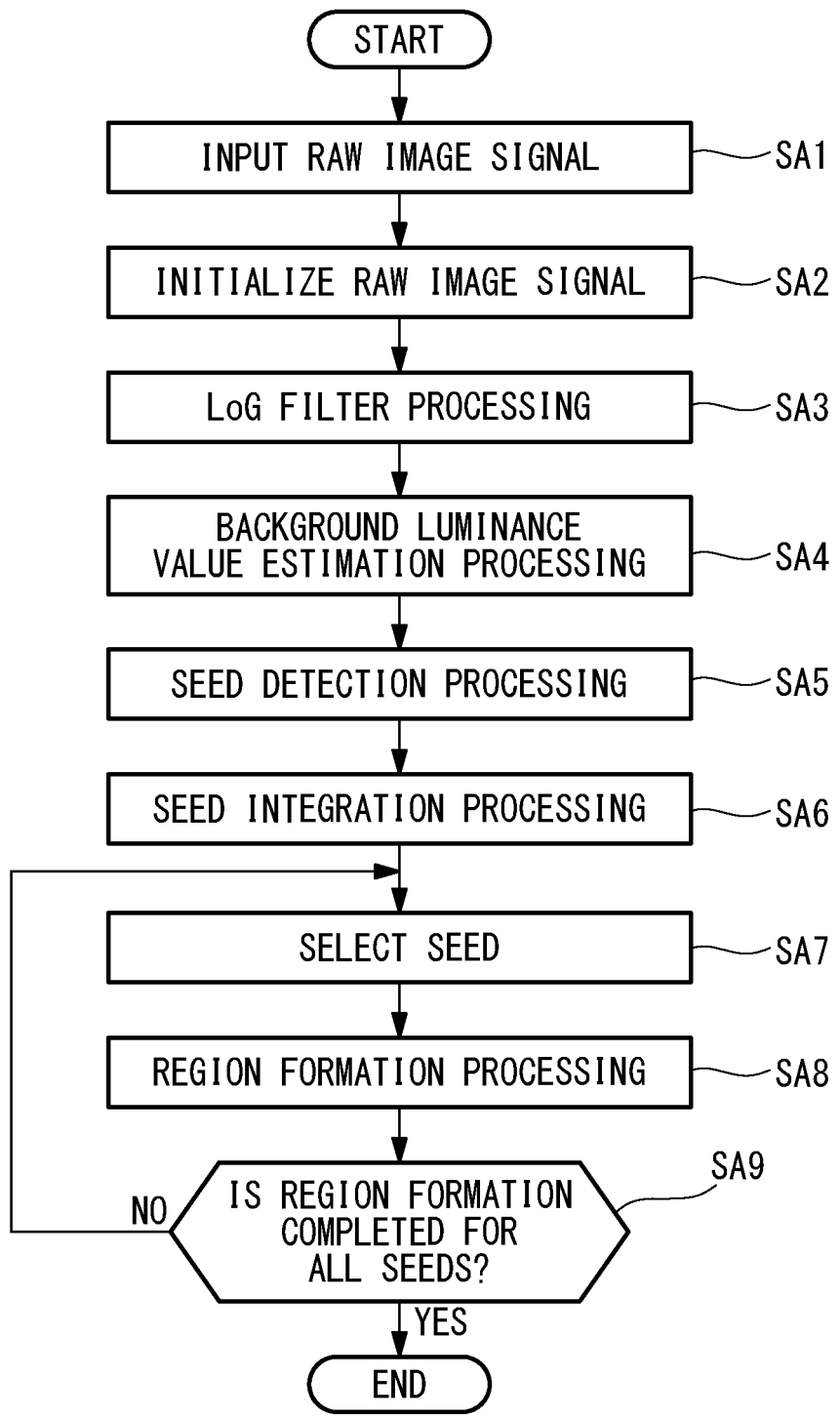
FIG. 9 is a flowchart for illustrating a cell recognition method according to the present invention.
Figure 10:
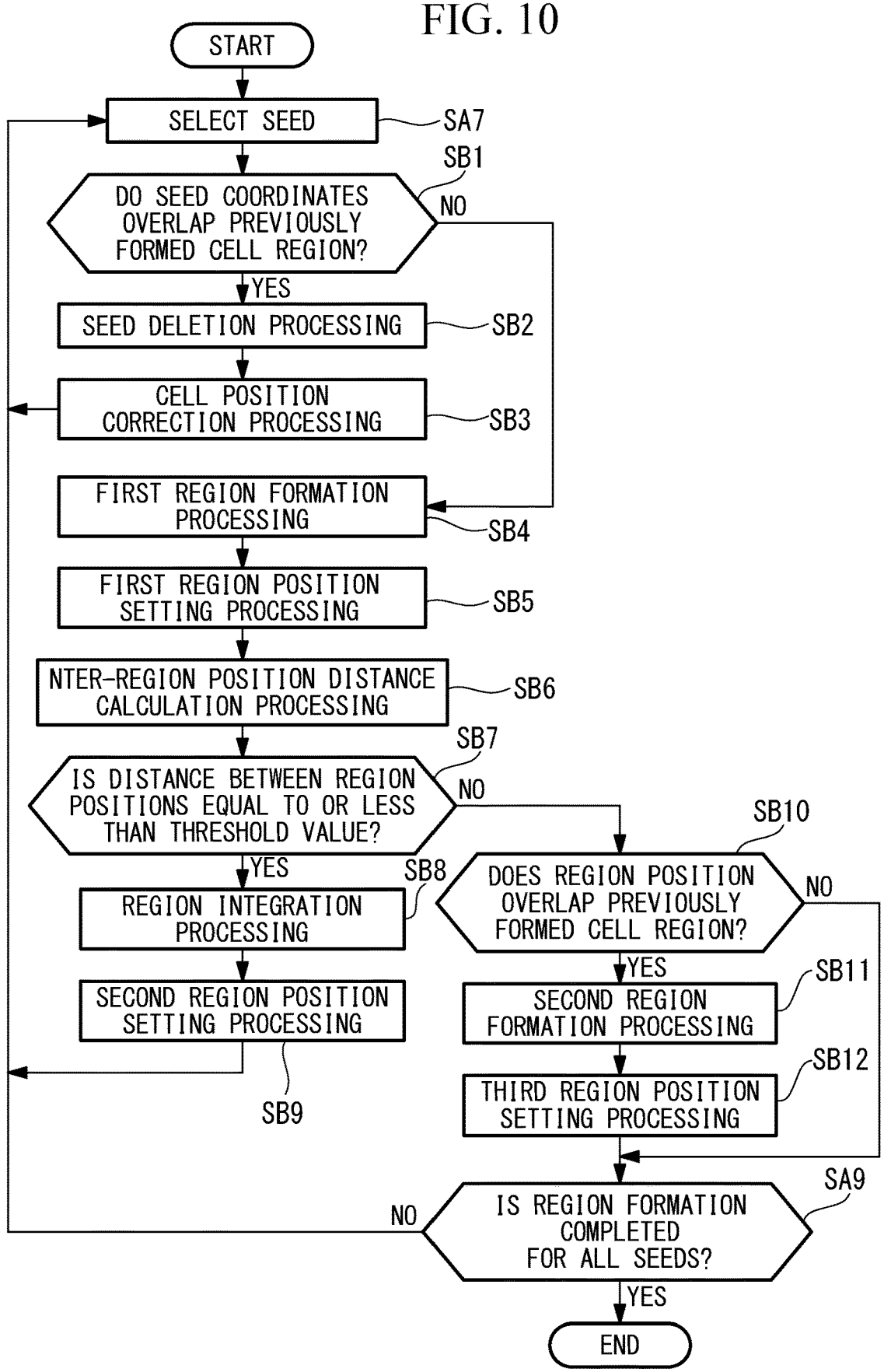
FIG. 10 is a flowchart for illustrating details of region formation processing in FIG. 9.

As illustrated in the flowcharts of FIGS. 9 and 10, the cell recognition method according to this embodiment includes: an LoG filter processing step (feature value calculation step) SA3 of calculating an LoG output value (feature value) representing how likely the pixel value in each pixel is to be an extreme value in the cell image acquired by capturing an image of the cell cluster composed of the plurality of cells C; a seed detection processing step (peak position recording step) SA5 of detecting and recording a peak pixel position at which the LoG output value is larger than a prescribed feature value threshold value in the cell image; a cell region formation step SA8 of forming, for each peak pixel position recorded in the seed detection processing step SA5, a cell region on the basis of the distribution of the pixel values of a plurality of pixels included in a region peripheral to the peak pixel position in the cell image; a first region position setting processing step SB5, a second region position setting processing step SB9, and a third region position setting processing step SB12 serving as a cell region position identification step of identifying the center position of each cell region formed in the cell region formation step SA8; and proximity state determination steps SB1, SB7, and SB10 of determining a proximity state between the cell region being currently formed in the cell region formation step SA8 and a previously formed cell region by using at least one of the peak pixel position, the morphology of the cell region, and the center position of the cell region.

Thereafter, when it is determined in the proximity state determination steps SB1, SB7, and SB10 that the proximity state described above is satisfied, at least one of the currently formed cell region and the previously formed cell region is corrected in the cell region formation step SA8.

The operation of the image processing device 5, the cell recognition device 1, and the cell recognition method with the above-described structure will be described below.

As illustrated in the flowchart of FIG. 9, in order to recognize the cells C using the image processing device 5, the cell recognition device 1, and the cell recognition method according to this embodiment, three-dimensional Z-stack image data acquired by the image acquisition device 3 is first input to the background luminance estimation unit 7, the seed generation unit 11, and the region generation unit 13 as a raw image signal from which cells are recognized (step SA1).

Next, in the seed generation unit 11, the input raw image signal is initialized by the initialization unit 17 (step SA2), and then the LoG filter is applied by the LoG filter unit 19 to that initialized raw image signal (Log filter processing, step SA3). Thereafter, an LoG output value is calculated by the LoG filter unit 19 for each pixel of the initialized raw image signal to generate an LoG output value image, and the generated LoG output value image is transferred to the seed detection processing unit 21.

Furthermore, a luminance histogram, as shown in FIG. 4, is generated by the background luminance estimation unit 7 from the input raw image signal, and a background luminance value is estimated on the basis of this generated luminance histogram (background luminance value estimation processing, step SA4).

Figure 11:
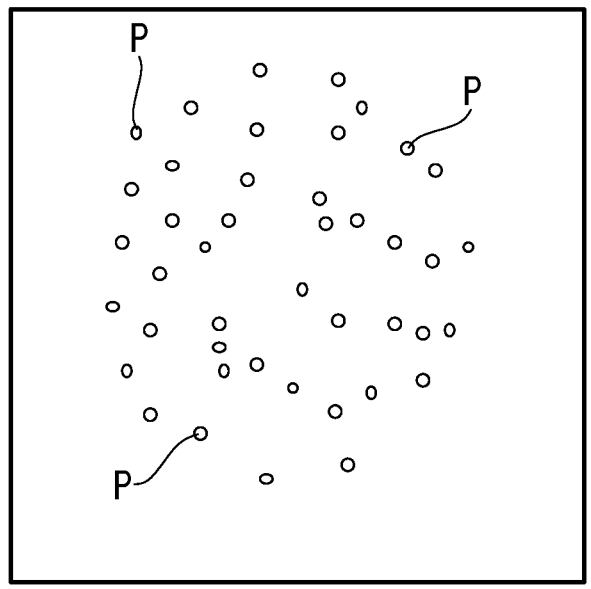
FIG. 11 is a diagram for illustrating a plurality of peak pixel positions at each of which the LoG output value locally exhibits a maximum value.

Subsequently, on the basis of the LoG output value image sent from the seed generation unit 11, peak pixel positions at which the LoG output values indicate maximum values locally, as shown in FIG. 11, are detected by the seed detection processing unit 21 as potential cell positions (seed detection processing, step SA5). In FIG. 11, reference sign P denotes a peak pixel position. Thereafter, the sets of seed coordinates of the detected peak pixel positions and the LoG output values at the peak pixel positions are transferred as seed information from the seed detection processing unit 21 to the seed integration processing unit 23.

Subsequently, the distance between the sets of seed coordinates in two items of seed information is calculated and it is determined whether or not the distance is equal to or less than the proximity threshold value by the seed integration processing unit 23. Thereafter, when it is determined that the distance is equal to or less than the proximity threshold value, the set of seed coordinates having the larger LoG output value of the two sets of seed coordinates are kept, and the other set of seed coordinates are discarded (seed integration processing, step SA6). This integration processing is applied to all items of seed information, and the kept seed information is transferred to the sorting unit 25. Thereafter, the seed information is sorted by the sorting unit 25 in descending order of the LoG output value and is then transferred to the region generation unit 13.

Figure 12:
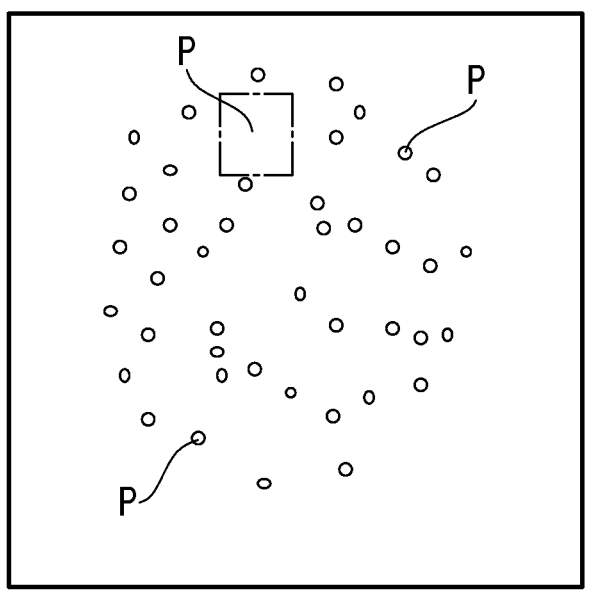
FIG. 12 is a diagram for illustrating a situation in which seed information is selected in descending order of the LoG output value.

Subsequently, in the region generation unit 13, the seed information sent from the sorting unit 25 is first recorded by the seed recording unit 27. As shown in FIG. 12, the seed information recorded in the seed recording unit 27 is then selected by the seed selection unit 33, one at a time, in descending order of the LoG output value 1 (step SA7).

Next, region formation processing (step SA8) performed by the region generation unit 13 will be described in detail with reference to the flowchart in FIG. 10.

First, the seed information selected by the seed selection unit 33 is transferred to the first overlapping determination unit 35. Then, it is determined by the first overlapping determination unit 35 whether or not the set of seed coordinates of the currently formed cell region sent by the seed selection unit 33 overlap a previously formed cell region recorded in the region recording unit 29. More specifically as shown in FIG. 8A, it is determined by the first overlapping determination unit 35 whether or not the distance between the set of seed coordinates sent by the seed selection unit 33 and the set of seed coordinates of the cell region recorded in the region recording unit 29 is equal to or less than a prescribed peak threshold value (step SB1).

When it is determined by the first overlapping determination unit 35 that the set of seed coordinates of the currently formed cell region overlap the previously formed cell region ("YES" in step SB1), the set of seed coordinates of the currently formed cell region are deleted from the record by the seed recording unit 27 (seed deletion processing, step SB2). In addition, the set of seed coordinate values of the previously formed cell region are corrected by the cell position correction unit 37 on the basis of the set of seed coordinates of the currently formed cell region (cell position correction processing, step SB3).

Figure 13:
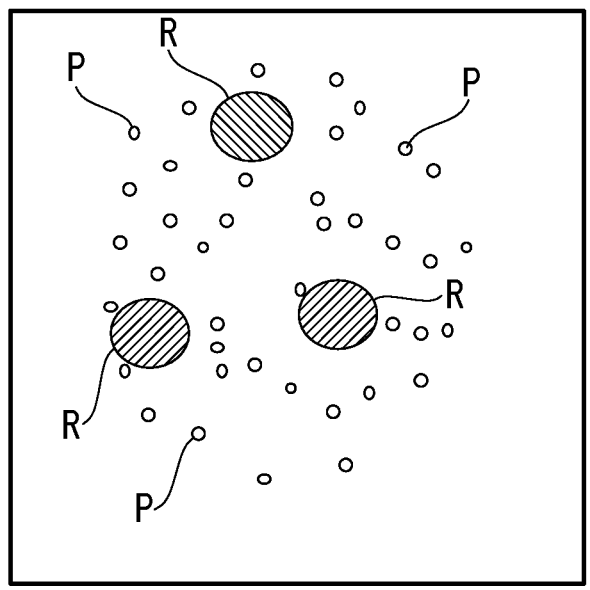
FIG. 13 is a diagram for illustrating a situation in which cell regions are formed, one for each set of seed coordinates.

On the other hand, when it is determined by the first overlapping determination unit 35 that the set of seed coordinates of the currently formed cell region do not overlap the previously formed cell region ("NO" in step SB1), a cell region is formed, as shown in FIG. 13, by the first region formation unit 39 on the basis of the raw image signal sent from the image acquisition device 3 and the spatial distribution of pixel values peripheral to the set of seed coordinates sent from the first overlapping determination unit 35 (first region formation processing, step SB4). In FIG. 13, reference sign R denotes a cell region.

Next, the center position of the cell region formed by the first region formation unit 39 is calculated by the first region position setting unit 41 and is set as a region position (first region position setting processing, cell region position identification step, step SB5), and the set region position is transferred to the inter-region position distance calculation unit 43 and the second overlapping determination unit 51.

Next, the distance between the center position (region position) of the previously formed cell region recorded in the position recording unit 31 and the region position (center position of the cell region) sent from the first region position setting unit 41 is calculated by the inter-region position distance calculation unit 43 (inter-region position distance calculation processing, step SB6), and the calculated distance is transferred to the threshold value processing unit 45.

Next, it is determined by the threshold value processing unit 45 whether or not the distance calculated by the inter-region position distance calculation unit 43 is equal to or less than a preset prescribed inter-center position threshold value (step SB7).

When it is determined by the threshold value processing unit 45 that the distance is equal to or less than the prescribed inter-center position threshold value, the cell region formed by the first region formation unit 39 is integrated with the existing, proximate cell region by the region integration processing unit 47, as shown in FIG. 8B, thus forming a new cell region (region integration processing, step SB8).

Thereafter, the new cell region formed by the region integration processing unit 47 is recorded by the region recording unit 29, the center position of the new cell region is calculated by the second region position setting unit 49 and is set as a region position (second region position setting processing, step SB9), and the set region position is recorded by the position recording unit 31.

On the other hand, when it is determined by the threshold value processing unit 45 that the distance is greater than the prescribed inter-center position threshold value, it is determined by the second overlapping determination unit 51 whether or not the previously formed cell region recorded in the region recording unit 29 overlaps the region position (center position of the cell region) sent from the first region position setting unit 41 (step SB10).

When it is determined by the second overlapping determination unit 51 that the previously formed cell region overlaps the region position sent from the first region position setting unit 41, the two cell regions are re-formed by the second region formation unit 53, as shown in FIG. 8C, such that the two cell regions are restricted to the region occupied by the two overlapping cell regions sent from the second overlapping determination unit 51 (second region formation processing, step SB11).

Thereafter, the two cell regions re-formed by the second region formation unit 53 are recorded by the region recording unit 29, the center positions of the two cell regions are calculated by the third region position setting unit 55 and are set as the respective region positions (third region position setting processing, step SB12), and each of the set region positions is recorded by the position recording unit 31.

On the other hand, when it is determined by the second overlapping determination unit 51 that the previously formed cell region does not overlap the region position sent from the first region position setting unit 41, the cell region at that region position is recorded in the region recording unit 29, and that region position is recorded in the position recording unit 31, thus ending processing on the present seed (seed information).

Figure 14:
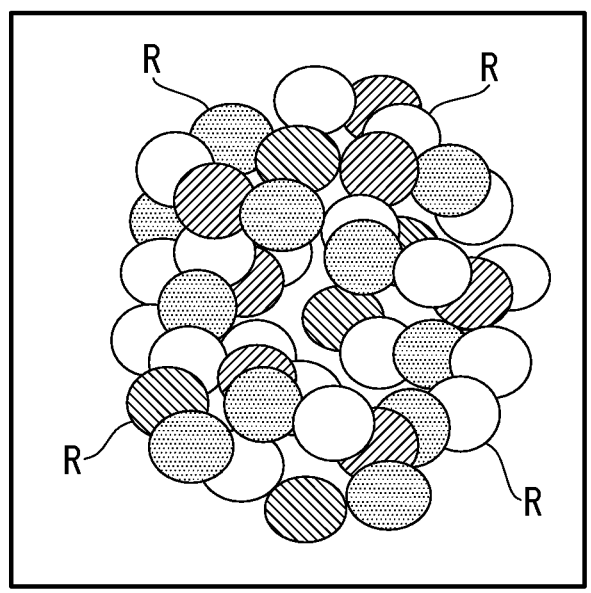
FIG. 14 is a diagram depicting one example of a cell region division image in which individual cell regions are delimited.

Finally, it is determined by the system controller (not shown in the figure) whether or not region formation is completed for all seeds (items of seed information) (step SA9), and if region formation is not completed for all seeds, the flow returns to step SA7. On the other hand, if region formation is completed for all seeds, the processing ends, and thereafter, a cell region division image in which individual cell regions are delimited, as shown in FIG. 14, is recorded by the region recording unit 29, and the result of the cell region division is transferred to the output unit 15 and output.

As described above, according to the image processing device 5, the cell recognition device 1, and the cell recognition method of this embodiment, because the cells C often have a higher pixel value than the background in the cell image, the cells C are highly likely to be present at peak pixel positions at which the LoG output values, which indicate how likely the pixel values are to be extreme values, calculated by the LoG filter unit 19 are larger than the prescribed feature value threshold value. Therefore, the region of each of the plurality of cells C constituting the cell cluster can be extracted by causing the seed detection processing unit 21 to detect a plurality of peak pixel positions in the cell image and then causing the region generation unit 13 to form a cell region for each of the sets of seed coordinates of the peak pixel positions on the basis of the distribution of the pixel values in a region peripheral to the set of the seed coordinates.

In this case, cell regions are sequentially formed independently for each of the sets of seed coordinates, and therefore, depending on the order of region generation, some sets of seed coordinates may already have cell regions formed thereon on the basis of a previously selected set of seed coordinates. With this being the situation, if the first overlapping determination unit 35, the threshold value processing unit 45, and the second overlapping determination unit 51 determine that the currently formed cell region is proximate to a previously formed cell region by using at least one of the peak pixel position, the morphology of the cell region, and the center position of the cell region, then each of the neighboring cell regions can be delimited, regardless of a partial overlapping of those cell regions, by causing the first region formation unit 39, the region integration processing unit 47, and the second region formation unit 53 to correct either or both of the currently formed cell region and the previously formed cell region. For this reason, the individual cells C can be extracted with high accuracy from the cell image acquired by capturing an image of the cell cluster composed of the plurality of living cells C.

In this embodiment, the second overlapping determination unit 51 determines whether or not a previously formed cell region recorded in the region recording unit 29 overlaps the region position (center position of the cell region) sent from the first region position setting unit 41. Instead of this, the second overlapping determination unit 51 may determine whether or not the region position of a previously formed cell region recorded in the region recording unit 29 overlaps the cell region that corresponds to the region position sent from the first region position setting unit 41 and that is sent from the first region formation unit 39.

In addition, in this embodiment, the formation of a cell region performed by the first region formation unit 39 and the identification of a region position performed by the first region position setting unit 41 may be concurrently applied to pixel positions that are different from each other. Likewise, the formation of a cell region performed by the region integration processing unit 47 and the identification of a region position performed by the second region position setting unit 49 may be concurrently applied to peak pixel positions that are different from each other, and furthermore, the formation of a cell region performed by the second region formation unit 53 and the identification of a region position performed by the third region position setting unit 55 may be concurrently applied to peak pixel positions that are different from each other.

By doing so, formation of a cell region and identification of a region position can be performed more efficiently and in a shorter time period for all peak pixel positions.

Second Embodiment

Next, an image processing device, a cell recognition device, and a cell recognition method according to a second embodiment of the present invention will be described.

Figure 15:
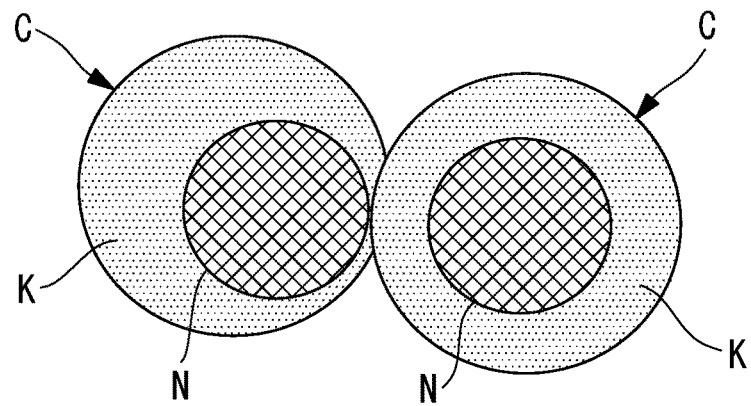
FIG. 15 is schematic diagram depicting one example of cell nuclei and cytoplasms constituting cells.

The image processing device, the cell recognition device, and the cell recognition method according to this embodiment differ from the first embodiment in that, as shown in FIG. 15, the region of each of the cells C is divided into the region corresponding to a cell nucleus N (first cell region) and the region corresponding to a cytoplasm K peripheral to the cell nucleus N (second cell region) before a cell region is formed.

Hereinafter, the same components in this embodiment as those used in the image processing device 5, the cell recognition device 1, and the cell recognition method according to the first embodiment are denoted by the same reference signs, and thus will not be described.

Figure 16:
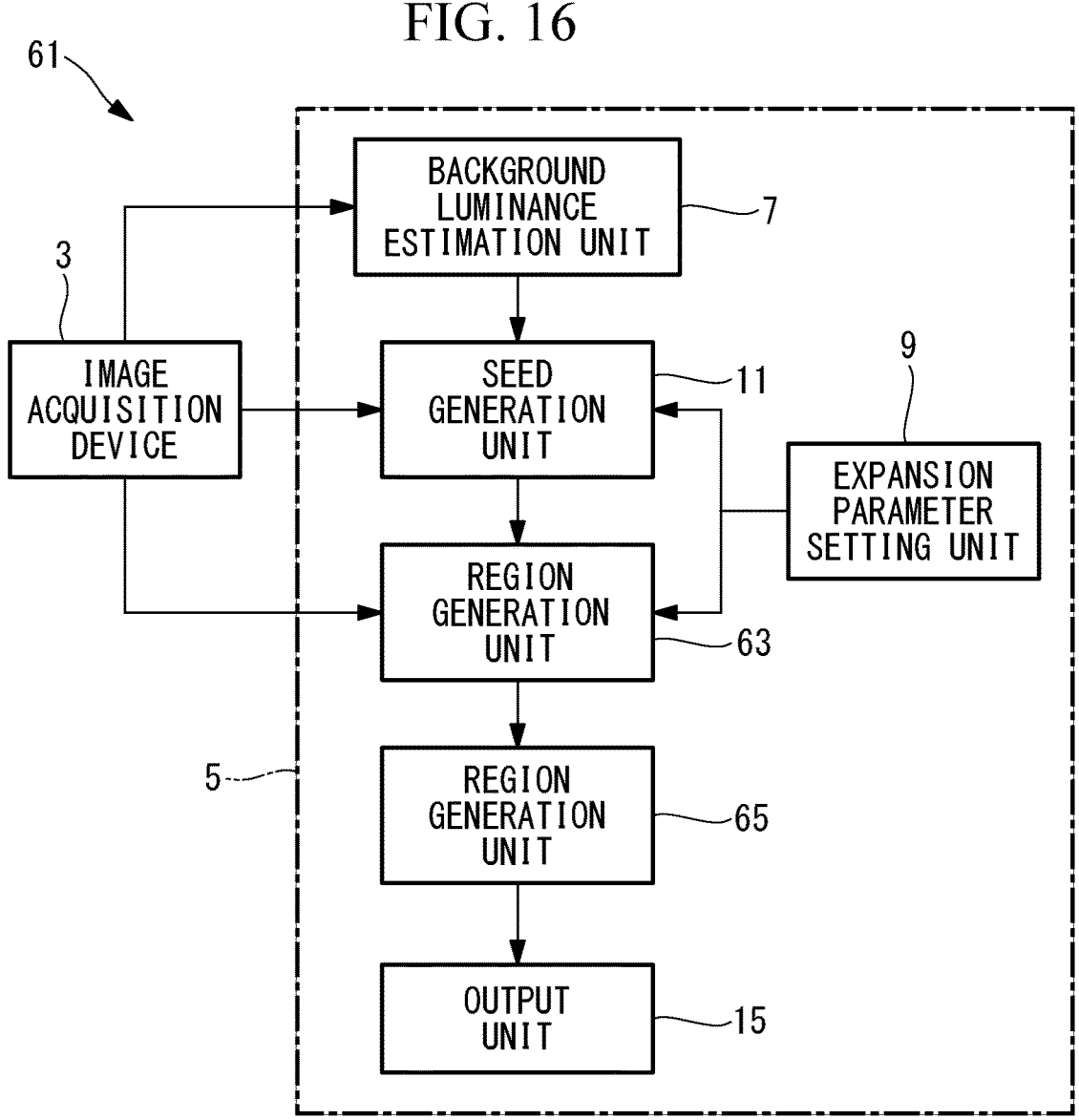
FIG. 16 is a block diagram showing the configuration of a cell recognition device according to a second embodiment of the present invention.

As shown in FIG. 16, in a cell recognition device 61 according to this embodiment, the image processing device 5 includes the background luminance estimation unit 7, the expansion parameter setting unit 9, the seed generation unit 11, a region generation unit 63 instead of the region generation unit 13, the output unit 15, and a newly added region growing unit 65.

Each of these processing units is connected to the system controller (not shown in the figure), so that the operation thereof is controlled. In addition, each of these processing units may be composed of, for example, a CPU and a storage device, such as a RAM and a ROM, for storing an arithmetic operation program. In that case, it is advisable that a cell recognition program, serving as the arithmetic operation program, be stored in the ROM.

Figure 17C:
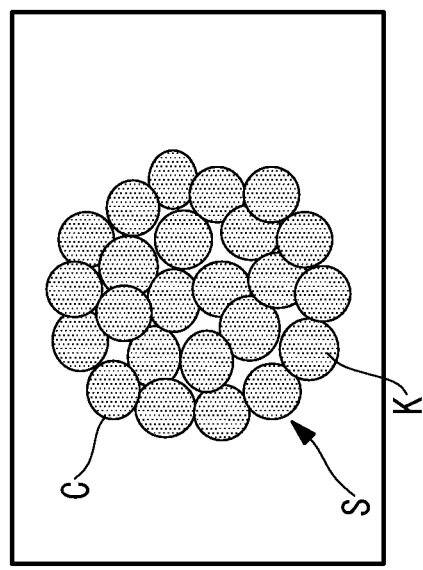
FIG. 17C is a schematic diagram depicting cytoplasm regions.
Figure 17B:
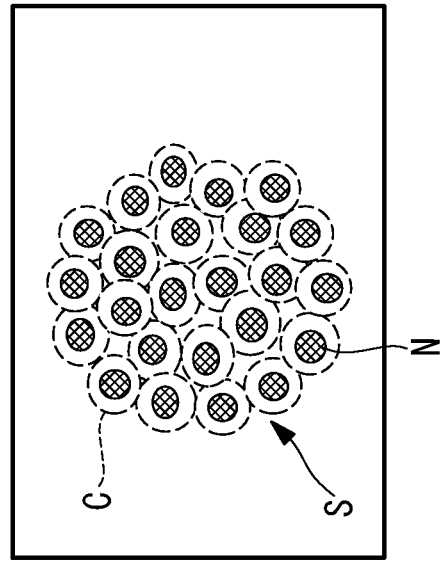
FIG. 17B is a schematic diagram depicting cell nucleus regions.
Figure 17E:
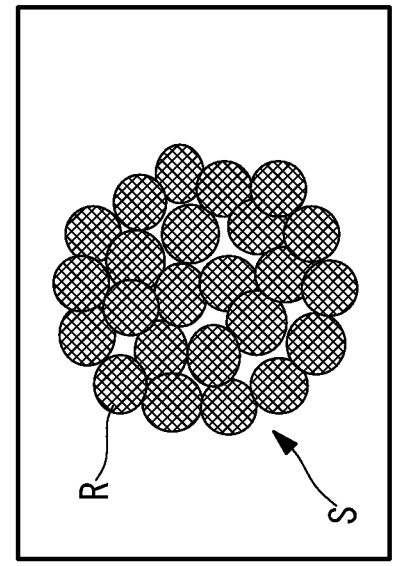
FIG. 17E is a diagram depicting a resultant region growth image.
Figure 17A:
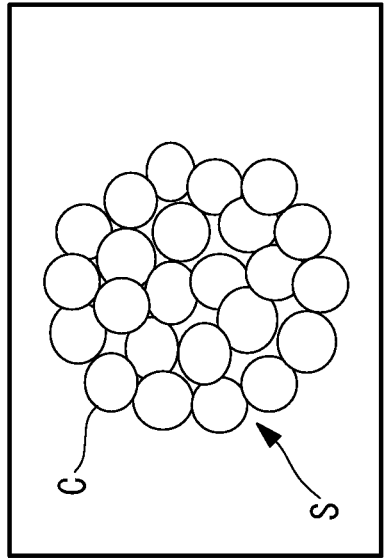
FIG. 17A is a diagram depicting one example of a spheroid (raw image) in which cells aggregate in the form of a three-dimensional agglomerate.

In the region generation unit 63, individual regions corresponding to the cell nuclei N and individual regions corresponding to the cytoplasms K are generated from the raw image signal of the spheroid S, as shown in FIG. 17A, on the basis of the seed information generated by the seed generation unit 11.

Figure 18:
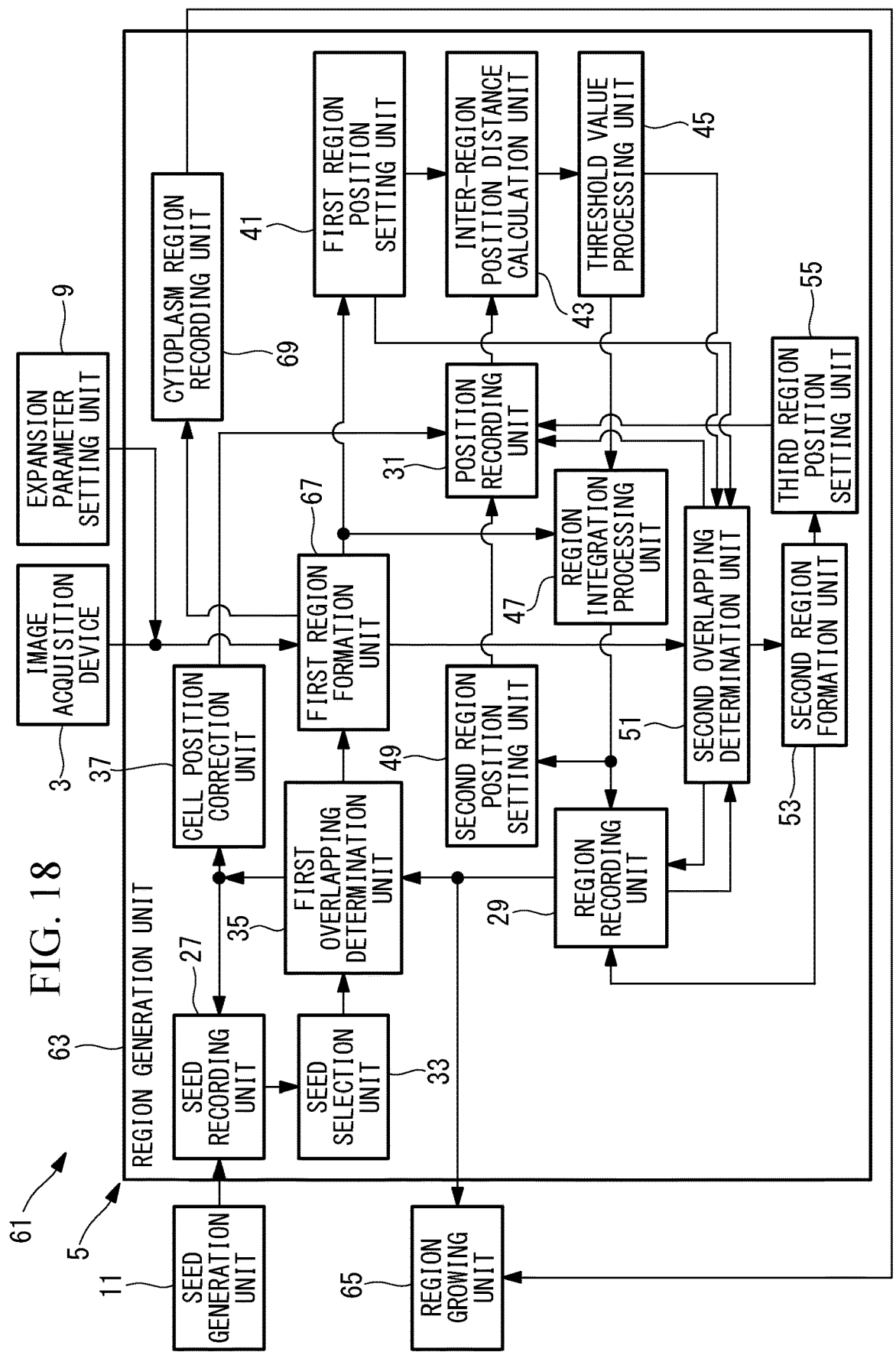
FIG. 18 is a block diagram showing a specific configuration of a region generation unit in FIG. 16.

As shown in FIG. 18, this region generation unit 63 includes: the seed recording unit (peak position recording unit) 27; the region recording unit 29; the position recording unit 31; the seed selection unit 33; the first overlapping determination unit (proximity state determination unit) 35; the cell position correction unit (first correction unit) 37; a first region formation unit (cell region formation unit, first region formation unit, second region formation unit) 67 instead of the first region formation unit 39; the first region position setting unit (cell region position identification unit) 41; the inter-region position distance calculation unit 43; the threshold value processing unit (proximity state determination unit) 45; the region integration processing unit (cell region formation unit, second correction unit) 47; the second region position setting unit (cell region position identification unit) 49; the second overlapping determination unit (proximity state determination unit) 51; the second region formation unit (cell region formation unit, third correction unit) 53; the third region position setting unit (cell region position identification unit) 55; and a newly added cytoplasm region recording unit 69.

The first region formation unit 67 forms a region corresponding to the cell nucleus N (hereinafter, referred to as the cell nucleus region), as shown in FIG. 17B, via the same processing as in the first region formation unit 39 of the first embodiment, on the basis of the spatial distribution of pixel values peripheral to the set of seed coordinates sent from the first overlapping determination unit 35 such that the cell nucleus region is restricted to a region that is proximate to the set of seed coordinates and that has a higher luminance than a prescribed luminance threshold value. The cell nucleus region formed by the first region formation unit 67 is transferred to the first region position setting unit 41, the region integration processing unit 47, and the second overlapping determination unit 51.

In addition, concurrently with the formation of the cell nucleus region, the first region formation unit 67 forms, on the basis of the spatial distribution of pixel values peripheral to the set of seed coordinates, a region corresponding to the cytoplasm K (hereinafter, referred to as the cytoplasm region), as shown in FIG. 17C, including a region having a luminance equal to or less than the prescribed luminance threshold value such that the region is not restricted to the proximity of the set of seed coordinates.

More specifically, the first region formation unit 67 forms a cytoplasm region by applying binarization processing based on adaptive threshold value processing directly to a trimming region image centered on the set of seed coordinates sent from the first overlapping determination unit 35. The cytoplasm region formed by the first region formation unit 67 is transferred to the cytoplasm region recording unit 69.

In this embodiment, the first region position setting unit 41 calculates the center position of the cell nucleus region sent from the first region formation unit 67, sets it as the region position, and transfers the region position to the inter-region position distance calculation unit 43 and the second overlapping determination unit 51.

The cytoplasm region recording unit 69 functions as a buffer memory of the same size as that of the raw image signal, the buffer memory being used to record an interim result in a series of procedures for generating a cytoplasm region for each set of seed coordinates. In the cytoplasm region recording unit 69, the formed cytoplasm region is written to the buffer and is updated, as needed.

In the final stage, a cytoplasm region image, representing the distribution of the cytoplasms, is recorded in the cytoplasm region recording unit 69. When the cytoplasm region image is recorded in the cytoplasm region recording unit 69, individual cytoplasms do not always need to be delimited in the cytoplasm region image. The cytoplasm region image recorded by the cytoplasm region recording unit 69 is transferred to the region growing unit 65.

In this embodiment, in the final stage, a cell nucleus region division image, representing individual cell nucleus regions, is recorded in the region recording unit 29. The cell nucleus region division image recorded by the region recording unit 29 is transferred to the region growing unit 65.

The region growing unit 65 applies a region division method based on the region growing method to the cell nucleus region division image sent from the region recording unit 29 of the region generation unit 63 and to the cytoplasm region image sent from the cytoplasm region recording unit 69 of the region generation unit 63 and generates a cell region division image in which individual cell regions are delimited.

Figure 17D:
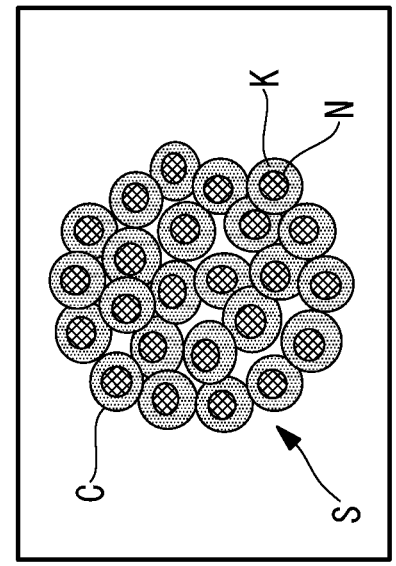
FIG. 17D is a diagram depicting a superimposed image of cell nucleus regions and cytoplasm regions.

More specifically, as shown in FIG. 17D, the region growing unit 65 places a new individual cell nucleus region (region corresponding to the cell nucleus N), serving as an initial region, in each of the cytoplasm regions (regions corresponding to the cytoplasm K) and subsequently grows the initial region by applying the region growing method to the initial region such that the region growing range is restricted to the cytoplasm region, thus forming individual cell regions as shown in FIG. 17E. By doing so, a cell region division image, in which individual cell regions are delimited, is formed. In FIG. 17E, reference sign R denotes a cell region. The cell region division image formed by the region growing unit 65 is transferred to the output unit 15.

Next, the cell recognition method according to this embodiment will be described.

Figure 19:
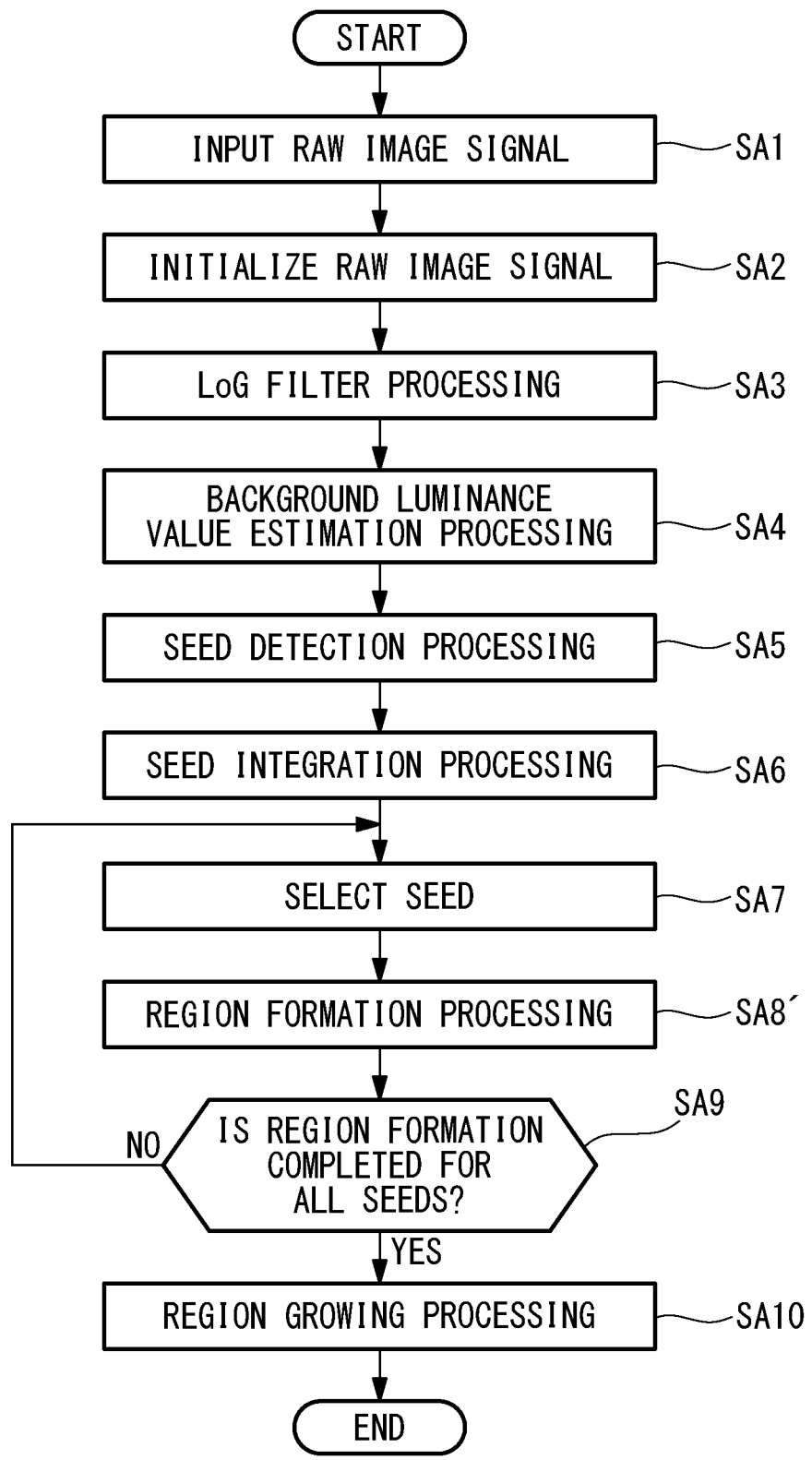
FIG. 19 is a flowchart for illustrating a cell recognition method according to the second embodiment of the present invention.
Figure 20:
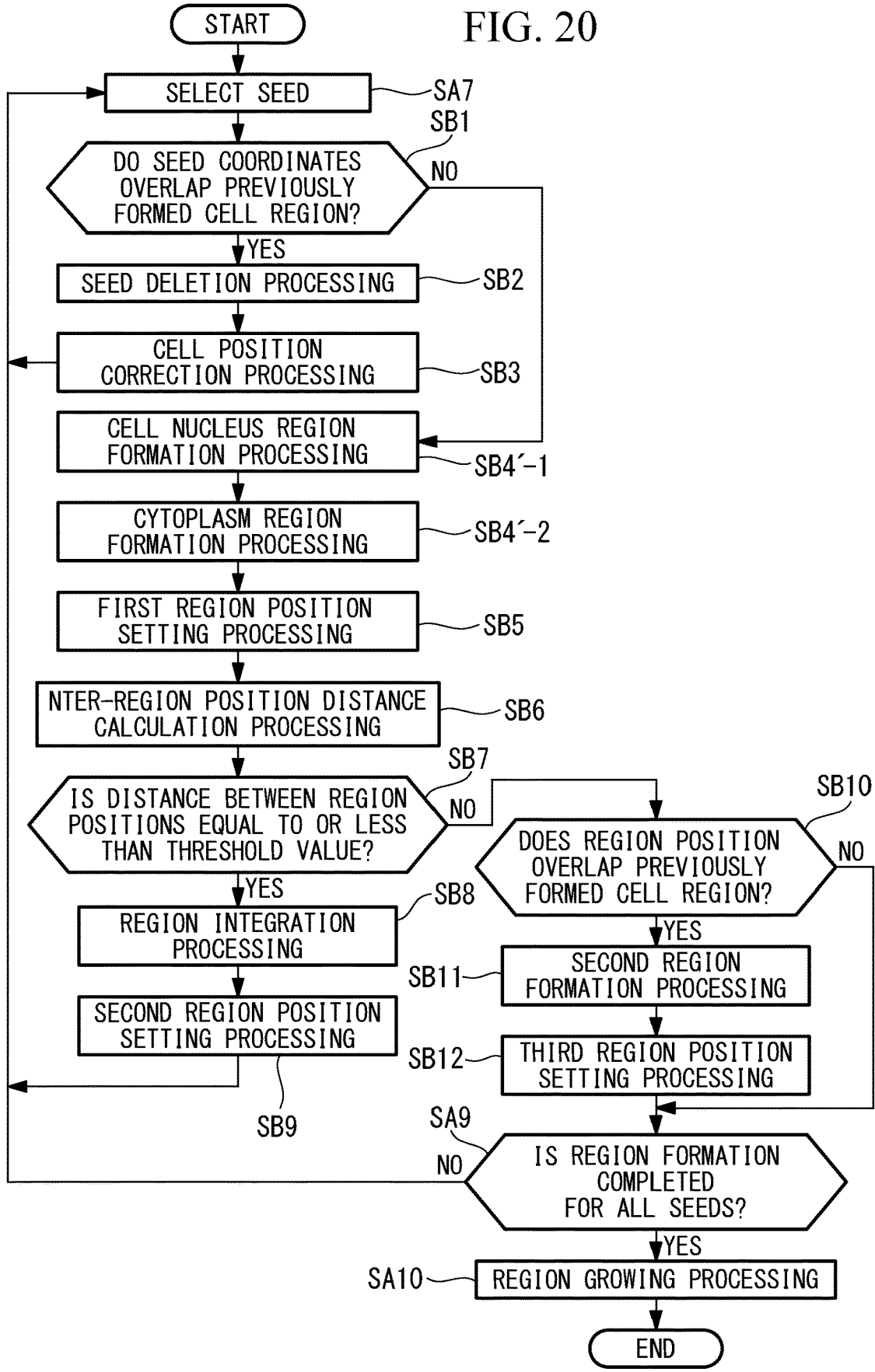
FIG. 20 is a flowchart for illustrating details of region formation processing in FIG. 19.

As illustrated in the flowcharts of FIGS. 19 and 20, the cell recognition method according to this embodiment includes: a cell nucleus region formation step (first region formation step) SB4'-1 in which a cell region formation step SA8', instead of the cell region formation step SA8 in the first embodiment, forms a cell nucleus region on the basis of a luminance distribution such that the cell nucleus region is restricted to a region that is proximate to the peak pixel position and that has a higher luminance than the prescribed luminance threshold value; a cytoplasm region formation step (second region formation step) SB4'-2 of forming a cytoplasm region, including a region having a luminance equal to or less than the prescribed luminance threshold value, on the basis of the luminance distribution without being restricted to the proximity of the peak position; and a region growing step SA10 of assigning each of the cell nucleus regions formed for all peak pixel positions in the cell nucleus region formation step SB4'-1 to an initial region and making the initial region grow such that the region growing range is restricted to the cytoplasm region formed in the cytoplasm region formation step SB4'-2.

The operation of the image processing device 5, the cell recognition device 61, and the cell recognition method with the above-described structure will be described.

As illustrated in the flowchart of FIG. 20, in order to recognize the cells C using the image processing device 5, the cell recognition device 61, and the cell recognition method according to this embodiment, when it is determined by the first overlapping determination unit 35 that the set of seed coordinates of the currently formed cell region sent by the seed selection unit 33 overlap a previously formed cell region recorded in the region recording unit 29 ("YES" in step SB1), the set of seed coordinates of the currently formed cell nucleus region are deleted from the record by the seed recording unit 27 (seed deletion processing, step SB2), and the set of seed coordinate values of the previously formed cell nucleus region are corrected by the cell position correction unit 37 on the basis of the set of seed coordinates of the currently formed cell nucleus region (cell position correction processing, step SB3).

On the other hand, when it is determined by the first overlapping determination unit 35 that the set of seed coordinates of the currently formed cell region do not overlap the previously formed cell region ("NO" in step SB1), a cell nucleus region restricted to the proximity of the set of seed coordinates, as shown in FIG. 17B, is formed by the first region formation unit 39 by following the same procedure as in the first embodiment (cell nucleus region formation processing, step SB4'-1).

The cell nucleus region formed by the first region formation unit 67 is transferred to the first region position setting unit 41, the region integration processing unit 47, and the second overlapping determination unit 51. Thereafter, in the same manner as in the processing performed on a cell region in the first embodiment, steps SB5 to SA9 are performed for the cell nucleus region. Thereafter, the formed cell nucleus region is transferred to the region recording unit 29, and a cell nucleus region division image, representing individual cell nucleus regions, that is finally recorded in the region recording unit 29 is transferred to the region growing unit 65.

In addition, concurrently with the formation of the cell nucleus region, a cytoplasm region, as shown in FIG. 17C, including a region peripheral to the set of seed coordinates, without being restricted to the proximity of the set of seed coordinates, is formed by the first region formation unit 39 (cytoplasm region formation processing, step SB4'-2). The cytoplasm region formed by the first region formation unit 67 is transferred to the cytoplasm region recording unit 69. Thereafter, the cytoplasm region image, which is finally recorded in the cytoplasm region recording unit 69, is transferred to the region growing unit 65.

Lastly, when it is determined by the system controller (not shown in the figure) that region formation is completed for all seeds ("YES" in step SA9), the region growing unit 65 applies a region division method based on the region growing method to the cell nucleus region division image sent from the region recording unit 29 and to the cytoplasm region image sent from the cytoplasm region recording unit 69, thereby forming individual cell regions as shown in FIG. 17E (region growing processing, step SA10). Thereafter, the result of cell region division in the form of the cell region division image, in which individual cell regions are delimited, is transferred from the region growing unit 65 to the output unit 15 and is output.

As described above, each entire cell region is composed of the region corresponding to the cell nucleus N and the region corresponding to the cytoplasm K such that the cytoplasm region is disposed in the periphery of the cell nucleus region. In a typical cell image, cell nucleus regions have a higher luminance and a more distinct outline than peripheral cytoplasm regions, and thus, cell nucleus regions are easier to discriminate from each other, resulting in higher division accuracy. On the other hand, a cytoplasm region adjoins another cytoplasm region, and it is often difficult to identify the boundary thereof. Thus, it is difficult to increase the accuracy at which cytoplasm regions are separated from each other, compared with cell nucleus regions.

According to the image processing device 5, the cell recognition device 61, and the cell recognition method of this embodiment, the first region formation unit 67 forms a cell nucleus region that is proximate to a peak pixel position and that has a higher luminance than the prescribed luminance threshold value, uses the individual cell nucleus region as an initial region in the region growing method, forms a cytoplasm region including a region having a luminance equal to or less than the prescribed luminance threshold value without being restricted to the proximity of the peak pixel position, and uses the cytoplasm region as a limit for the region growing range, thereby making it possible to enhance the accuracy of the shape of the cell region based on the cytoplasm region while increasing the cell region division accuracy on the basis of the cell nucleus region.

In this embodiment, the second overlapping determination unit 51 may determine whether or not a previously formed cell nucleus region recorded in the region recording unit 29 overlaps the region position (center position of the cell nucleus region) sent from the first region position setting unit 41 or may determine whether or not the region position of a previously formed cell nucleus region recorded in the region recording unit 29 overlaps the cell nucleus region that corresponds to the region position sent from the first region position setting unit 41 and that is sent from the first region formation unit 67.

Furthermore, in this embodiment, the formation of the cell nucleus region performed by the first region formation unit 67 and the identification of the region position performed by the first region position setting unit 41 may be performed concurrently for peak pixel positions that are different from each other. Likewise, the formation of the cell nucleus region performed by the region integration processing unit 47 and the identification of the region position performed by the second region position setting unit 49 may be performed concurrently for peak pixel positions that are different from each other, and furthermore, the formation of the cell nucleus region performed by the second region formation unit 53 and the identification of the region position performed by the third region position setting unit 55 may be performed concurrently for peak pixel positions that are different from each other.

Moreover, although each of the above-described embodiments has been described by way of an example where the image processing method is realized with hardware, instead of this, the image processing method may be realized with a computer-executable image processing program.

Although the embodiments of the present invention have been described in detail with reference to the drawings, the specific structure is not limited to those of these embodiments but includes design changes etc. that do not depart from the spirit of the present invention. The present invention is not limited to the invention applied to each of the above-described embodiments and modifications but can be applied to, for example, embodiments in which these embodiments and modifications are appropriately combined, and is not particularly limited.

From the above-described embodiment, the following invention is also derived.

A first aspect of the present invention is an image processing device including: a feature value calculation unit for calculating a feature value, the feature value representing how likely a pixel value in each of pixels in a cell image formed by capturing an image of a cell cluster composed of a plurality of cells is to be an extreme value; a peak position detection unit for detecting, as peak positions, pixel positions the feature value of which are greater than a prescribed feature value threshold value in the cell image; a peak position recording unit for recording the peak positions detected by the peak position detection unit; a cell region formation unit for forming, one at a time for the peak positions recorded by the peak position recording unit, a cell region on the basis of a distribution of the pixel values of a plurality of pixels included in a region peripheral to the peak position in the cell image; a cell region position identification unit for identifying a center position of the cell region formed by the cell region formation unit; and a proximity state determination unit for determining, by using at least one of the peak position, a morphology of the cell region, and the center position of the cell region, a proximity state between the cell region currently formed by the cell region formation unit and a previously formed cell region, wherein, when the proximity state determination unit determines that the proximity state is satisfied, the cell region formation unit corrects at least one of the currently formed cell region and the previously formed cell region.

According to this aspect, because the cells often include pixel values higher than the pixel value of the background in the cell image, cells are highly likely to exist at peak positions having a feature value (representing how likely the pixel value is to be an extreme value) that is calculated by the feature value calculation unit and that is larger than the prescribed feature value threshold value. Therefore, the region of each of the plurality of cells constituting the cell cluster can be extracted by causing the peak position detection unit to detect a plurality of peak positions in the cell image, causing the peak position recording unit to record those peak positions, and causing the cell region formation unit to form a cell region for each of the peak positions on the basis of the distribution of the pixel values in a region peripheral to the pixel position.

In this case, even if neighboring cell regions partially overlap each other, the individual cell regions can be delimited by causing the cell region position identification unit to identify the center positions of the cell regions and causing the cell region formation unit to correct at least one of the currently formed cell region and a previously formed cell region when the proximity state determination unit determines that the currently formed cell region is proximate to the previously formed cell region by using at least one of the peak position, the morphology of the cell region, and the center position of the cell region. Therefore, individual cells can be extracted with high accuracy from the cell image formed by capturing an image of the cell cluster composed of the plurality of living cells.

In the above-described aspect, the cell region formation unit may include a first correction unit that does not perform the formation of the cell region when the proximity state determination unit determines that the distance between the peak position of the currently formed cell region and the peak position of the previously formed cell region is equal to or less than a prescribed peak threshold value, and the peak position recording unit may delete, from the record, the peak position of the currently formed cell region for which it has been determined by the proximity state determination unit that the distance between the peak position of the currently formed cell region and the peak position of the previously formed cell region is equal to or less than the prescribed peak threshold value.

In the cell region formation unit, cell regions are sequentially formed independently for each of the peak positions recorded in the peak position recording unit, and hence, depending on the procedures for forming cell regions, a cell region may have been formed on the basis of a previously selected peak position. For this reason, with the above-described structure, the first formation unit eliminates the need for redundantly forming a cell region for a peak position adjacent to a peak position for which a cell region has been formed and also relieves the peak position recording unit from redundantly recording such a peak position.

In the above-described aspect, when the proximity state determination unit determines that the distance between the peak position of the currently formed cell region and the peak position of the previously formed cell region is equal to or less than the prescribed peak threshold value, the first correction unit may correct the center position of the previously formed cell region on the basis of the peak position of the currently formed cell region.

With this structure, the first correction unit can make a correction so as to take a balance between the position of the previously formed cell region having a peak position adjacent to that of the currently formed cell region and the position of the currently formed cell region.

In the above-described aspect, the cell region formation unit may include a second correction unit that, when the proximity state determination unit determines that the distance between the peak position of the currently formed cell region and the peak position of the previously formed cell region is larger than a prescribed peak threshold value and that the distance between the center position of the currently formed cell region and the center position of the previously formed cell region is equal to or less than a prescribed inter-center position threshold value that is larger than the prescribed peak threshold value, forms a new cell region by integrating the two cell regions, and the cell region position identification unit may identify a center position of the cell region newly formed by the second correction unit.

It is difficult to delimit cell regions if the peak positions thereof are away from each other by more than the prescribed peak threshold value but the center positions thereof are adjacent to each other within a distance of the prescribed inter-center position threshold value, and furthermore, one of such cell regions may be largely hidden by the other. Therefore, with this structure, the second correction unit can prevent delimitation of such cell regions from becoming so complicated that the cell regions are difficult to recognize.

In the above-described aspect, the inter-center position threshold value may be set on the basis of the feature value of the corresponding peak position in the cell region.

In the above-described aspect, the cell region formation unit may include a third correction unit that, when the proximity state determination unit determines that the distance between the peak position of the currently formed cell region and the peak position of the previously formed cell region is greater than a prescribed peak threshold value and that the distance between the center position of the currently formed cell region and the center position of the previously formed cell region is greater than a prescribed inter-center position threshold value, which is greater than the prescribed peak threshold value, but determines that the center position of the currently formed cell region overlaps the previously formed cell region or that the currently formed cell region overlaps the center position of the previously formed cell region, forms or re-forms the two cell regions so as not to overlap each other, and the cell region position identification unit may identify center positions of the two cell regions formed or re-formed by the third correction unit.

Two cell regions—their peak positions are away from each other by more than the prescribed peak threshold value, their center positions are away from each other by more than the prescribed inter-center position threshold value, but the center position of one cell region overlaps the other cell region—have a sufficiently large non-overlapping region. Therefore, with this structure, the third correction unit can display such neighboring cell regions in a delimited manner.

In the above-described aspect, the third correction unit may form or re-form the two cell regions by using a region growing method.

With this structure, cell regions can be formed so as not to overlap each other by using a simple method.

In the above-described aspect, the peak position detection unit may delete the peak position the pixel value of which is equal to or less than a prescribed pixel threshold value.

With this structure, noise detected and recorded as a peak position can be removed.

In the above-described aspect, the prescribed pixel threshold value may be set on the basis of a background value estimated from the distribution of the pixel values of the cell image.

With this structure, peak positions can be selected such that regions darker than the background are regarded as non cells.

In the above-described aspect, the background value may be estimated from a bimodal Gaussian distribution fitted to the distribution of the pixel values.

The pixel values of the pixels belonging to the background are likely to be localized in a certain pixel value width, and the histogram can be regarded as a mixture distribution in which a sharp normal distribution, composed of pixels belonging to the background, and a flat normal distribution, composed of pixels belonging to the cells, are mixed. Therefore, with this structure, the background value can be easily estimated.

In the above-described aspect, the peak position recording unit may sort the recorded peak positions by the feature value and, when the distance between two neighboring peak positions of the peak positions is equal to or less than a prescribed proximity threshold value, may delete either one of the two neighboring peak positions from the record.

The larger the feature value of a peak position, the more likely the peak position belongs to a cell. Thus, with this structure, cell regions can be formed efficiently in descending order of feature value, starting with the peak position having the largest feature value. In this case, if two neighboring peak positions are extremely adjacent to each other with reference to the prescribed proximity threshold value, one of the peak positions can be deleted to prevent delimitation of the cell regions from becoming complicated, thereby making recognition of the cell regions easier.

In the above-described aspect, the feature value calculation unit may calculate, as the feature value, a LoG (Laplacian of Gaussian) filter output value in response to the cell image.

With this structure, the rise of the luminance can be easily detected using the LoG filter and can be calculated as a feature value.

In the above-described aspect, the cell region formation unit may form the cell region by binarizing the plurality of pixels included in the region peripheral to the peak position with reference to a pixel value distribution threshold value that is set on the basis of the distribution of the pixel values of the plurality of pixels.

With this structure, cell regions can be formed easily.

In the above-described aspect, the cell region formation unit may smooth the plurality of pixels included in the region peripheral to the peak position and may binarize the plurality of smoothed pixels.

With this structure, cell regions can be formed after the luminance has been smoothed.

In the above-described aspect, the cell region formation unit may set a prescribed adaptive binarization threshold value on the basis of the distribution of the pixel values and may binarize the plurality of pixels on the basis of the binarization threshold value.

With this structure, the cell region formation unit automatically sets the binarization threshold value, which facilitates the formation of a cell region.

In the above-described aspect, the prescribed binarization threshold value may be reset when the prescribed binarization threshold value is smaller, by a prescribed amount or more, than a maximum value of the pixel values of the plurality of pixels included in the region peripheral to the peak position.

With this structure, a cell region can be formed with higher accuracy by enhancing the adaptivity of the prescribed binarization threshold value.

In the above-described aspect, the cell region formation unit may set a range of the region peripheral to the peak position on the basis of the feature value of the peak position.

In the above-described aspect, the cell region formation unit may include a hole filling processing unit for filling a hole generated in the formed cell region.

With this structure, the distribution of cell regions can be recognized more easily by correcting a cell region with the hole filling processing unit.

In the above-described aspect, the cell region formation unit may smooth a boundary of the cell region.

With this structure, the boundary between cell regions can be smoothed.

In the above-described aspect, the cell region formation unit may include a fragment-region removing unit that, when the cell region is a region divided into a plurality of cell regions, keeps the cell region closest to the corresponding peak position and deletes the other cell regions.

With this structure, if fragment regions, like noise, fragmented by binarization are generated, the problem of erroneously detecting those fragment regions as cell regions can be suppressed by the fragment-region removing unit.

In the above-described aspect, formation of the cell region performed by the cell region formation unit and identification of the center position performed by the cell region position identification unit may be performed concurrently on peak positions different from each other.

With this structure, the formation of a cell region and identification of the center position of the cell region for all peak positions can be performed efficiently and in a shorter time period.

In the above-described aspect, the feature value calculation unit may calculate the feature value from the pixel values included in a region in a prescribed range set on the basis of a point spread function of an optical system used to acquire the cell image.

With this structure, in a case where individual cells are seemingly expanded as a result of blurring that has taken place in the cell image due to image quality deterioration during image acquisition, such as low optical performance, the feature value can be calculated by taking this expansion into account.

In the above-described aspect, the feature value calculation unit may calculate the feature value from the pixel values included in a region in a prescribed range set on the basis of an apparent extension rate in Z direction of morphologies of the cells in the cell image.

With this structure, in a case where individual cells are seemingly expanded as a result of blurring that has taken place in the cell image due to image quality deterioration during image acquisition, such as low optical performance, the feature value can be calculated by taking this expansion into account.

In the above-described aspect, the cell region formation unit may set a range of the region peripheral to the peak position on the basis of an apparent extension rate in Z direction of morphologies of the cells in the cell image.

With this structure, in a case where individual cells are seemingly expanded as a result of blurring that has taken place in the cell image due to image quality deterioration during image acquisition, such as low optical performance, a cell region can be formed by taking this expansion into account.

The above-described aspect may further include a setting unit for allowing a user to set the extension rate in Z direction.

With this structure, the size of a region peripheral to the peak position can be set with an expansion rate desired by the user.

In the above-described aspect, the cell region formation unit may include: a first region formation unit for forming a first cell region on the basis of a luminance distribution such that the first cell region is restricted to a region that is proximate to the peak position and that has a luminance higher than a prescribed luminance threshold value; a second region formation unit for forming, on the basis of the luminance distribution, a second cell region including a region having a luminance equal to or less than the prescribed luminance threshold value such that the second cell region is not restricted to the proximity of the peak position; and a region growing unit that sets, as an initial region, each of the first cell regions formed by the first region formation unit for all of the peak positions and that causes the initial region to grow such that a region growing range is restricted to the second cell region formed by the second region formation unit.

A cell region is divided into the cell nucleus and the cytoplasm, and the entire cell region is composed of the cell nucleus region and the cytoplasm region disposed peripheral to the cell nucleus region. In general, in the cell image, the cell nucleus region has a high luminance and a more distinct outline than the cytoplasm region peripheral thereto, and hence cell nucleus regions are easy to discriminate from each other, thus making it possible to easily enhance the division accuracy. On the other hand, because the cytoplasm region adjoins another cytoplasm region, the boundary between cytoplasm regions is difficult to identify, making it difficult to enhance the division accuracy for the cytoplasm region, compared with the cell nucleus region.

For this reason, the first region formation unit forms a first cell region that has a luminance higher than the prescribed luminance threshold value and that is proximate to the peak position, each of the first cell regions is used as an initial region in the region growing method, and furthermore, the second region formation unit forms a second cell region including a region having a luminance equal to or less than the prescribed luminance threshold value without restricting to the proximity of the peak position such that the second cell region is used as a limit of the region growing range, thereby making it possible to enhance the accuracy of the morphology of a cell on the basis of the second cell region while enhancing the cell region division accuracy on the basis of the first cell region.

A second aspect of the present invention is a cell recognition device including: an image acquisition unit for acquiring a cell image formed by capturing an image of a cell cluster composed of a plurality of cells; a feature value calculation unit for calculating a feature value, the feature value representing how likely a pixel value in each of pixels in the cell image acquired by the image acquisition unit is to be an extreme value; a peak position detection unit for detecting, as peak positions, pixel positions the feature value of which are greater than a prescribed feature value threshold value in the cell image; a peak position recording unit for recording the peak positions detected by the peak position detection unit; a cell region formation unit for forming, one at a time for the peak positions recorded by the peak position recording unit, a cell region on the basis of the distribution of the pixel values of a plurality of pixels included in a region peripheral to the peak position in the cell image; a cell region position identification unit for identifying a center position of the cell region formed by the cell region formation unit; and a proximity state determination unit for determining, by using at least one of the peak position, a morphology of the cell region, and the center position of the cell region, a proximity state between the cell region currently formed by the cell region formation unit and a previously formed cell region, wherein, when the proximity state determination unit determines that the proximity state is satisfied, the cell region formation unit corrects at least one of the currently formed cell region and the previously formed cell region.

According to this aspect, individual cells can be extracted with high accuracy from the cell image formed by capturing, with the image acquisition unit, an image of the cell cluster composed of the plurality of living cells.

In the above-described aspect, the cell region formation unit may include a first correction unit that does not perform the formation of the cell region when the proximity state determination unit determines that the distance between the peak position of the currently formed cell region and the peak position of the previously formed cell region is equal to or less than a prescribed peak threshold value, and the peak position recording unit may delete, from the record, the peak position of the currently formed cell region for which it has been determined by the proximity state determination unit that the distance between the peak position of the currently formed cell region and the peak position of the previously formed cell region is equal to or less than the prescribed peak threshold value.

In the above-described aspect, when the proximity state determination unit determines that the distance between the peak position of the currently formed cell region and the peak position of the previously formed cell region is equal to or less than the prescribed peak threshold value, the first correction unit may correct the center position of the previously formed cell region on the basis of the peak position of the currently formed cell region.

In the above-described aspect, the cell region formation unit may include a second correction unit that, when the proximity state determination unit determines that the distance between the peak position of the currently formed cell region and the peak position of the previously formed cell region is larger than a prescribed peak threshold value and that the distance between the center position of the currently formed cell region and the center position of the previously formed cell region is equal to or less than a prescribed inter-center position threshold value that is larger than the prescribed peak threshold value, forms a new cell region by integrating the two cell regions, and the cell region position identification unit may identify a center position of the cell region newly formed by the second correction unit.

In the above-described aspect, the inter-center position threshold value may be set on the basis of the feature value of the corresponding peak position in the cell region.

In the above-described aspect, the cell region formation unit may include a third correction unit that, when the proximity state determination unit determines that the distance between the peak position of the currently formed cell region and the peak position of the previously formed cell region is greater than a prescribed peak threshold value and that the distance between the center position of the currently formed cell region and the center position of the previously formed cell region is greater than a prescribed inter-center position threshold value, which is greater than the prescribed peak threshold value, but determines that the center position of the currently formed cell region overlaps the previously formed cell region or that the currently formed cell region overlaps the center position of the previously formed cell region, forms or re-forms the two cell regions so as not to overlap each other, and the cell region position identification unit may identify center positions of the two cell regions formed or re-formed by the third correction unit.

In the above-described aspect, the third correction unit may form or re-form the two cell regions by using a region growing method.

In the above-described aspect, the feature value calculation unit may calculate the feature value from the pixel values included in a region in a prescribed range set on the basis of a point spread function of an optical system used to acquire the cell image.

In the above-described aspect, the feature value calculation unit may calculate the feature value from the pixel values included in a region in a prescribed range set on the basis of an apparent extension rate in Z direction of morphologies of the cells in the cell image.

In the above-described aspect, the cell region formation unit may set a range of the region peripheral to the peak position on the basis of an apparent extension rate in Z direction of morphologies of the cells in the cell image.

The above-described aspect may further include a setting unit for allowing a user to set the extension rate in Z direction.

A third aspect of the present invention is a cell recognition method including: a feature value calculation step of calculating a feature value, the feature value representing how likely a pixel value in each of pixels in a cell image formed by capturing an image of a cell cluster composed of a plurality of cells is to be an extreme value; a peak position recording step of detecting, as peak positions, pixel positions the feature value of which are greater than a prescribed feature value threshold value in the cell image and recording the peak positions; a cell region formation step of forming, one at a time for the peak positions recorded in the peak position recording step, a cell region on the basis of a distribution of the pixel values of a plurality of pixels included in a region peripheral to the peak position in the cell image; a cell region position identification step of identifying a center position of the cell region formed in the cell region formation step; and a proximity state determination step of determining, by using at least one of the peak position, a morphology of the cell region, and the center position of the cell region, a proximity state between the cell region currently formed in the cell region formation step and a previously formed cell region, wherein, when it is determined that the proximity state is satisfied in the proximity state determination step, at least one of the currently formed cell region and the previously formed cell region is corrected in the cell region formation step.

According to this aspect, the region of each of the plurality of cells constituting the cell cluster can be extracted by forming, in the cell region formation step, a cell region on the basis of the distribution of the pixel values in a region peripheral to each of the peak positions, which are pixel positions having a feature value (representing how likely the pixel value is to be an extreme value) that is calculated in the feature value calculation step that is larger than the prescribed feature value threshold value.

In this case, even if neighboring cell regions partially overlap each other, the individual cell regions can be delimited by identifying the center positions of the cell regions in the cell region position identification step and correcting at least one of the currently formed cell region and the previously formed cell region in the cell region formation step when it is determined in the proximity state determination step by using at least one of the peak position, the morphology of the cell region, and the center position of the cell region that the currently formed cell region is proximate to the previously formed cell region. Therefore, individual cells can be extracted with high accuracy from the cell image formed by capturing an image of the cell cluster composed of a plurality of living cells.

In the above-described aspect, the cell region formation step may include: a first region formation step of forming a first cell region on the basis of a luminance distribution such that the first cell region is restricted to a region that is proximate to the peak position and that has a luminance higher than a prescribed luminance threshold value; a second region formation step of forming, on the basis of the luminance distribution, a second cell region including a region having a luminance equal to or less than the prescribed luminance threshold value such that the second cell region is not restricted to the proximity of the peak position; and a region growing step of setting, as an initial region, each of the first cell regions formed for all of the peak positions in the first region formation step and causing the initial region to grow such that a region growing range is restricted to the second cell region formed in the second region formation step.

With this structure, a first cell region that has a luminance higher than the prescribed luminance threshold value and that is proximate to the peak position is formed in the first region formation step, each of the first cell regions is used as an initial region in the region growing method, and furthermore, a second cell region including a region having a luminance equal to or less than the prescribed luminance threshold value is formed in the second region formation step without restricting to the proximity of the peak such that the second cell region is used as a limit of the region growing range. By doing so, it is possible to enhance the accuracy of the morphology of a cell on the basis of the second cell region while enhancing the cell region division accuracy on the basis of the first cell region.

A fourth aspect of the present invention is a cell recognition program for causing a computer to execute: a feature value calculation step of calculating a feature value, the feature value representing how likely a pixel value in each of pixels in a cell image formed by capturing an image of a cell cluster composed of a plurality of cells is to be an extreme value; a peak position recording step of detecting, as peak positions, pixel positions the feature value of which are greater than a prescribed feature value threshold value in the cell image and recording the peak positions; a cell region formation step of forming, one at a time for the peak positions recorded in the peak position recording step, a cell region on the basis of a distribution of the pixel values of a plurality of pixels included in a region peripheral to the peak position in the cell image; a cell region position identification step of identifying a center position of the cell region formed in the cell region formation step; and a proximity state determination step of determining, by using at least one of the peak position, a morphology of the cell region, and the center position of the cell region, a proximity state between the cell region currently formed in the cell region formation step and a previously formed cell region, wherein, when it is determined that the proximity state is satisfied in the proximity state determination step, at least one of the currently formed cell region and the previously formed cell region is corrected in the cell region formation step.

According to this aspect, when the computer is executed, the region of each of the plurality of cells constituting the cell cluster can be extracted by forming, in the cell region formation step, a cell region on the basis of the distribution of the pixel values in a region peripheral to each of the peak positions having a high feature value calculated in the feature value calculation step.

In this case, when it is determined in the proximity state determination step by using at least one of the center position of the cell region identified in the cell region position identification step, the peak position, and the morphology of the cell region that the currently formed cell region is proximate to the previously formed cell region, the individual cell regions can be delimited by correcting at least one of the currently formed cell region and the previously formed cell region in the cell region formation step. Therefore, when the computer is executed, individual cells can be extracted with high accuracy from the cell image formed by capturing an image of the cell cluster composed of the plurality of living cells.

In the above-described aspect, the cell region formation step may include: a first region formation step of forming a first cell region on the basis of a luminance distribution such that the first cell region is restricted to a region that is proximate to the peak position and that has a luminance higher than a prescribed luminance threshold value; a second region formation step of forming, on the basis of the luminance distribution, a second cell region including a region having a luminance equal to or less than the prescribed luminance threshold value such that the second cell region is not restricted to the proximity of the peak position; and a region growing step of setting, as an initial region, each of the first cell regions formed for all of the peak positions in the first region formation step and causing the initial region to grow such that a region growing range is restricted to the second cell region formed in the second region formation step.

(Additional Item 1)
An image processing device comprising:
a memory; and
a processor comprising hardware, the processor configured to:
calculate a feature value, the feature value representing how likely a pixel value in each of pixels in a cell image formed by capturing an image of a cell cluster composed of a plurality of cells is to be an extreme value;
detect, as peak positions, pixel positions the feature value of which are greater than a prescribed feature value threshold value in the cell image;
record the detected peak positions in the memory;
form, one at a time for the recorded peak positions recorded in the memory, a cell region on the basis of a distribution of the pixel values of a plurality of pixels included in a region peripheral to the peak position in the cell image;
identify a center position of the formed cell region;
determine, by using at least one of the peak position, a morphology of the cell region, and the center position of the cell region, a proximity state between the currently formed cell region and a previously formed cell region; and
correct, when it is determined that the proximity state is satisfied, at least one of the currently formed cell region and the previously formed cell region.

(Additional Item 2)
The image processing device according to Additional Item 1, wherein the processor is configured to:
not perform the formation of the cell region when it is determined that the distance between the peak position of the currently formed cell region and the peak position of the previously formed cell region is equal to or less than a prescribed peak threshold value; and
delete, from the record, the peak position of the currently formed cell region for which it has been determined that the distance between the peak position of the currently formed cell region and the peak position of the previously formed cell region is equal to or less than the prescribed peak threshold value.

(Additional Item 3)
The image processing device according to Additional Item 2, wherein the processor is configured to correct, when it is determined that the distance between the peak position of the currently formed cell region and the peak position of the previously formed cell region is equal to or less than the prescribed peak threshold value, the center position of the previously formed cell region on the basis of the peak position of the currently formed cell region.

(Additional Item 4)
The image processing device according one of Additional Items 1 to 3, wherein the processor is configured to:
form, when it is determined that the distance between the peak position of the currently formed cell region and the peak position of the previously formed cell region is larger than a prescribed peak threshold value and that the distance between the center position of the currently formed cell region and the center position of the previously formed cell region is equal to or less than a prescribed inter-center position threshold value that is larger than the prescribed peak threshold value, a new cell region by integrating the two cell regions; and
identify a center position of the newly formed cell region.

(Additional Item 5)
The image processing device according to Additional Item 4, wherein the inter-center position threshold value is set on the basis of the feature value of the corresponding peak position in the cell region.

(Additional Item 6)
The image processing device according to one of Additional Items 1 to 5, wherein the processor is configured to:
form or re-form, when it is determined that the distance between the peak position of the currently formed cell region and the peak position of the previously formed cell region is greater than a prescribed peak threshold value and that the distance between the center position of the currently formed cell region and the center position of the previously formed cell region is greater than a prescribed inter-center position threshold value, which is greater than the prescribed peak threshold value, but it is determined that the center position of the currently formed cell region overlaps the previously formed cell region or that the currently formed cell region overlaps the center position of the previously formed cell region, the two cell regions so as not to overlap each other; and identify center positions of the formed or re-formed two cell regions.

(Additional Item 7)

The image processing device according to Additional Item 6, wherein the processor is configured to form or re-form the two cell regions by using a region growing method.

(Additional Item 8)

The image processing device according to one of Additional Items 1 to 7, wherein the processor is configured to delete the peak position the pixel value of which is equal to or less than a prescribed pixel threshold value.

(Additional Item 9)

The image processing device according to Additional Item 8, wherein the prescribed pixel threshold value is set on the basis of a background value estimated from the distribution of the pixel values of the cell image.

(Additional Item 10)

The image processing device according to Additional Item 9, wherein the background value is estimated from a bimodal Gaussian distribution fitted to the distribution of the pixel values.

(Additional Item 11)

The image processing device according to one of Additional Items 1 to 10, wherein the processor is configured to sort the recorded peak positions by the feature value and delete, when the distance between two neighboring peak positions of the peak positions is equal to or less than a prescribed proximity threshold value, either one of the two neighboring peak positions from the record.

(Additional Item 12)

The image processing device according to one of Additional Items 1 to 11, wherein the processor is configured to calculate, as the feature value, a LoG (Laplacian of Gaussian) filter output value in response to the cell image.

(Additional Item 13)

The image processing device according to one of Additional Items 1 to 12, wherein the processor is configured to form the cell region by binarizing the plurality of pixels included in the region peripheral to the peak position with reference to a pixel value distribution threshold value that is set on the basis of the distribution of the pixel values of the plurality of pixels.

(Additional Item 14)

The image processing device according to Additional Item 13, wherein the processor is configured to smooth the plurality of pixels included in the region peripheral to the peak position and binarizes the plurality of smoothed pixels.

(Additional Item 15)

The image processing device according to one of Additional Items 13 and 14, wherein the processor is configured to set a prescribed adaptive binarization threshold value on the basis of the distribution of the pixel values and binarize the plurality of pixels on the basis of the binarization threshold value.

(Additional Item 16)

The image processing device according to Additional Item 15, wherein the prescribed binarization threshold value is reset when the prescribed binarization threshold value is smaller, by a prescribed amount or more, than a maximum value of the pixel values of the plurality of pixels included in the region peripheral to the peak position.

(Additional Item 17)

The image processing device according to one of Additional Items 1 to 16, wherein the processor is configured to set a range of the region peripheral to the peak position on the basis of the feature value of the peak position.

(Additional Item 18)

The image processing device according to one of Additional Items 1 to 17, wherein the processor is configured to fill a hole generated in the formed cell region.

(Additional Item 19)

The image processing device according to one of Additional Items 1 to 18, wherein the processor is configured to smooth a boundary of the cell region.

(Additional Item 20)

The image processing device according to one of Additional Items 1 to 19, wherein when the cell region is a region divided into a plurality of cell regions, the processor is configured to keep the cell region closest to the corresponding peak position and delete the other cell regions.

(Additional Item 21)

The image processing device according to one of Additional Items 1 to 20, wherein formation of the cell region and identification of the center position are performed concurrently on peak positions different from each other.

(Additional Item 22)

The image processing device according to one of Additional Items 1 to 21, wherein the processor is configured to calculate the feature value from the pixel values included in a region in a prescribed range set on the basis of a point spread function of an optical system used to acquire the cell image.

(Additional Item 23)

The image processing device according to one of Additional Items 1 to 21, wherein the processor is configured to calculate the feature value from the pixel values included in a region in a prescribed range set on the basis of an apparent extension rate in Z direction of morphologies of the cells in the cell image.

(Additional Item 24)

The image processing device according to one of Additional Items 1 to 23, wherein the processor is configured to set a range of the region peripheral to the peak position on the basis of an apparent extension rate in Z direction of morphologies of the cells in the cell image.

(Additional Item 25)

The image processing device according to Additional Item 24, wherein the processor is configured to allow a user to set the extension rate in Z direction.

(Additional Item 26)

The image processing device according to one of Additional Items 1 to 25, wherein the processor is configured to:

form a first cell region on the basis of a luminance distribution such that the first cell region is restricted to a region that is proximate to the peak position and that has a luminance higher than a prescribed luminance threshold value;

form, on the basis of the luminance distribution, a second cell region including a region having a luminance equal to or less than the prescribed luminance threshold value such that the second cell region is not restricted to the proximity of the peak position; and set, as an initial region, each of the first cell regions formed for all of the peak positions and cause the initial region to grow such that a region growing range is restricted to the formed second cell region.

(Additional Item 27)

A cell recognition device comprising:

an image acquisition device that is configured to acquire a cell image formed by capturing an image of a cell cluster composed of a plurality of cells; and an image processing device that includes a memory and a processor, the processor configured to:

calculate a feature value, the feature value representing how likely a pixel value in each of pixels in the cell image acquired by the image acquisition device is to be an extreme value;

detect, as peak positions, pixel positions the feature value of which are greater than a prescribed feature value threshold value in the cell image;

record the detected peak positions in the memory;

form, one at a time for the recorded peak positions recorded in the memory, a cell region on the basis of a distribution of the pixel values of a plurality of pixels included in a region peripheral to the peak position in the cell image;

identify a center position of the formed cell region;

determine, by using at least one of the peak position, a morphology of the cell region, and the center position of the cell region, a proximity state between the currently formed cell region and a previously formed cell region; and correct, when it is determined that the proximity state is satisfied, at least one of the currently formed cell region and the previously formed cell region.

(Additional Item 28)

The cell recognition device according to Additional Item 27, wherein the processor is configured to:

not perform the formation of the cell region when it is determined that the distance between the peak position of the currently formed cell region and the peak position of the previously formed cell region is equal to or less than a prescribed peak threshold value; and delete, from the record, the peak position of the currently formed cell region for which it has been determined that the distance between the peak position of the currently formed cell region and the peak position of the previously formed cell region is equal to or less than the prescribed peak threshold value.

(Additional Item 29)

The cell recognition device according to Additional Item 28, wherein the processor is configured to correct, when it is determined that the distance between the peak position of the currently formed cell region and the peak position of the previously formed cell region is equal to or less than the prescribed peak threshold value, the center position of the previously formed cell region on the basis of the peak position of the currently formed cell region.

(Additional Item 30)

The cell recognition device according to one of Additional Items 27 to 29, wherein the processor is configured to:

form, when it is determined that the distance between the peak position of the currently formed cell region and the peak position of the previously formed cell region is larger than a prescribed peak threshold value and that the distance between the center position of the currently formed cell region and the center position of the previously formed cell region is equal to or less than a prescribed inter-center position threshold value that is larger than the prescribed peak threshold value, a new cell region by integrating the two cell regions; and identify a center position of the newly formed cell region.

(Additional Item 31)

The cell recognition device according to Additional Item 30, wherein the inter-center position threshold value is set on the basis of the feature value of the corresponding peak position in the cell region.

(Additional Item 32)

The cell recognition device according to one of Additional Items 27 to 31, wherein the processor is configured to:

form or re-form, when it is determined that the distance between the peak position of the currently formed cell region and the peak position of the previously formed cell region is greater than a prescribed peak threshold value and that the distance between the center position of the currently formed cell region and the center position of the previously formed cell region is greater than a prescribed inter-center position threshold value, which is greater than the prescribed peak threshold value, but it is determined that the center position of the currently formed cell region overlaps the previously formed cell region or that the currently formed cell region overlaps the center position of the previously formed cell region, the two cell regions so as not to overlap each other; and identify center positions of the formed or re-formed two cell regions.

(Additional Item 33)

The cell recognition device according to Additional Item 32, wherein the processor is configured to form or re-form the two cell regions by using a region growing method.

(Additional Item 34)

The cell recognition device according to one of Additional Items 27 to 33, wherein the processor is configured to calculate the feature value from the pixel values included in a region in a prescribed range set on the basis of a point spread function of an optical system used to acquire the cell image.

(Additional Item 35)

The cell recognition device according to one of Additional Items 27 to 33, wherein the processor is configured to calculate the feature value from the pixel values included in a region in a prescribed range set on the basis of an apparent extension rate in Z direction of morphologies of the cells in the cell image.

(Additional Item 36)

The cell recognition device according to one of Additional Items 27 to 35, wherein the processor is configured to set a range of the region peripheral to the peak position on the basis of an apparent extension rate in Z direction of morphologies of the cells in the cell image.

(Additional Item 37)

The cell recognition device according to Additional Item 36, wherein the processor is configured to allow a user to set the extension rate in Z direction.

(Additional Item 38)

A cell recognition method comprising:

calculating a feature value, the feature value representing how likely a pixel value in each of pixels in a cell image formed by capturing an image of a cell cluster composed of a plurality of cells is to be an extreme value;

detecting, as peak positions, pixel positions the feature value of which are greater than a prescribed feature value threshold value in the cell image and recording the detected peak positions;

forming, one at a time for the recorded peak positions, a cell region on the basis of a distribution of the pixel values of a plurality of pixels included in a region peripheral to the peak position in the cell image;

identifying a center position of the formed cell region;

determining, by using at least one of the peak position, a morphology of the cell region, and the center position of the cell region, a proximity state between the currently formed cell region and a previously formed cell region; and correcting, when it is determined that the proximity state is satisfied, at least one of the currently formed cell region and the previously formed cell region.

(Additional Item 39)

The cell recognition method according to Additional Item 38, further including:

forming a first cell region on the basis of a luminance distribution such that the first cell region is restricted to a region that is proximate to the peak position and that has a luminance higher than a prescribed luminance threshold value;

forming, on the basis of the luminance distribution, a second cell region including a region having a luminance equal to or less than the prescribed luminance threshold value such that the second cell region is not restricted to the proximity of the peak position; and setting, as an initial region, each of the first cell regions formed for all of the peak positions and causing the initial region to grow such that a region growing range is restricted to the formed second cell region.

(Additional Item 40)

A non-transitory computer-readable medium having a cell recognition program stored thereon, the cell recognition program causing a computer to execute functions of:

calculating a feature value, the feature value representing how likely a pixel value in each of pixels in a cell image formed by capturing an image of a cell cluster composed of a plurality of cells is to be an extreme value;

detecting, as peak positions, pixel positions the feature value of which are greater than a prescribed feature value threshold value in the cell image and recording the peak positions;

forming, one at a time for the recorded peak positions, a cell region on the basis of a distribution of the pixel values of a plurality of pixels included in a region peripheral to the peak position in the cell image;

identifying a center position of the formed cell region;

determining, by using at least one of the peak position, a morphology of the cell region, and the center position of the cell region, a proximity state between the currently formed cell region and a previously formed cell region; and correcting, when it is determined that the proximity state is satisfied, at least one of the currently formed cell region and the previously formed cell region.

(Additional Item 41)

The non-transitory computer-readable medium according to Additional Item 40, wherein the cell recognition program further including functions of:

forming a first cell region on the basis of a luminance distribution such that the first cell region is restricted to a region that is proximate to the peak position and that has a luminance higher than a prescribed luminance threshold value;

forming, on the basis of the luminance distribution, a second cell region including a region having a luminance equal to or less than the prescribed luminance threshold value such that the second cell region is not restricted to the proximity of the peak position; and setting, as an initial region, each of the first cell regions formed for all of the peak positions and causing the initial region to grow such that a region growing range is restricted to the formed second cell region.

REFERENCE SIGNS LIST

1, 61 Cell recognition device
3 Image acquisition device (image acquisition unit)
5 Image processing device
9 Expansion parameter setting unit (setting unit)
13, 63 Region generation unit (cell region formation unit)
19 LoG filter unit (feature value calculation unit)
21 Seed detection processing unit (peak position detection unit)
27 Seed recording unit (peak position recording unit)
35 First overlapping determination unit (proximity state determination unit)
37 Cell position correction unit (first correction unit)
39 First region formation unit (cell region formation unit, hole filling processing unit, fragment-region removing unit)
41 First region position setting unit (cell region position identification unit)
45 Threshold value processing unit (proximity state determination unit)
47 Region integration processing unit (cell region formation unit, second correction unit)
49 Second region position setting unit (cell region position identification unit)
51 Second overlapping determination unit (proximity state determination unit)
53 Second region formation unit (cell region formation unit, third correction unit)
55 Third region position setting unit (cell region position identification unit)
65 Region growing unit
67 First region formation unit (cell region formation unit, first region formation unit, second region formation unit)
69 Cytoplasm region recording unit
SA3 LoG filter processing step (feature value calculation step)
SA5 Seed detection processing step (peak position recording step)
SA8, SA8' Cell region formation step
SB1, SB7, SB10 Proximity state determination step
SB5, SB9, SB12 Cell region position identification step
C Cell

The invention claimed is:

1. An image processing device comprising:
a memory; and
a processor comprising hardware, the processor configured to:
calculate a feature value, the feature value representing a likelihood of a pixel value in each of pixels in a cell image formed by capturing an image of a cell cluster composed of a plurality of cells being an extreme value;
detect, as peak positions, pixel positions the feature value of which are greater than a prescribed feature value threshold value in the cell image;
record the detected peak positions in the memory;

form, one at a time for the recorded peak positions recorded in the memory, a cell region on the basis of a distribution of the pixel values of a plurality of pixels included in a region peripheral to the peak position in the cell image;

identify a center position of the formed cell region;

determine, by using at least one of the peak position, a morphology of the cell region, and the center position of the cell region, a proximity state between the currently formed cell region and a previously formed cell region; and correct, when it is determined that the proximity state is satisfied, at least one of the currently formed cell region and the previously formed cell region, wherein formation of the cell region and identification of the center position are performed concurrently on peak positions different from each other.

2. The image processing device according to claim 1, wherein the processor is configured to:

not perform the formation of the cell region when it is determined that the distance between the peak position of the currently formed cell region and the peak position of the previously formed cell region is equal to or less than a prescribed peak threshold value; and delete, from the record, the peak position of the currently formed cell region for which it has been determined that the distance between the peak position of the currently formed cell region and the peak position of the previously formed cell region is equal to or less than the prescribed peak threshold value.

3. The image processing device according to claim 1, wherein the processor is configured to:

form, when it is determined that the distance between the peak position of the currently formed cell region and the peak position of the previously formed cell region is larger than a prescribed peak threshold value and that the distance between the center position of the currently formed cell region and the center position of the previously formed cell region is equal to or less than a prescribed inter-center position threshold value that is larger than the prescribed peak threshold value, a new cell region by integrating the two cell regions; and identify a center position of the newly formed cell region.

4. The image processing device according to claim 1, wherein the processor is configured to:

form or re-form, when it is determined that the distance between the peak position of the currently formed cell region and the peak position of the previously formed cell region is greater than a prescribed peak threshold value and that the distance between the center position of the currently formed cell region and the center position of the previously formed cell region is greater than a prescribed inter-center position threshold value, which is greater than the prescribed peak threshold value, but it is determined that the center position of the currently formed cell region overlaps the previously formed cell region or that the currently formed cell region overlaps the center position of the previously formed cell region, the two cell regions so as not to overlap each other; and identify center positions of the formed or re-formed two cell regions.

5. The image processing device according to claim 1, wherein the processor is configured to sort the recorded peak positions by the feature value and delete, when the distance between two neighboring peak positions of the peak positions is equal to or less than a prescribed proximity threshold value, either one of the two neighboring peak positions from the record.

6. The image processing device according to claim 1, wherein the processor is configured to form the cell region by binarizing the plurality of pixels included in the region peripheral to the peak position with reference to a pixel value distribution threshold value that is set on the basis of the distribution of the pixel values of the plurality of pixels.

7. The image processing device according to claim 1, wherein the processor is configured to calculate the feature value from the pixel values included in a region in a prescribed range set on the basis of a point spread function of an optical system used to acquire the cell image.

8. The image processing device according to claim 1, wherein the processor is configured to calculate the feature value from the pixel values included in a region in a prescribed range set on the basis of an apparent extension rate in Z direction of morphologies of the cells in the cell image.

9. The image processing device according to claim 8, wherein the prescribed pixel threshold value is set on the basis of a background value estimated from the distribution of the pixel values of the cell image.

10. The image processing device according to claim 1, wherein the processor is configured to:

form a first cell region on the basis of a luminance distribution such that the first cell region is restricted to a region that is proximate to the peak position and that has a luminance higher than a prescribed luminance threshold value;

form, on the basis of the luminance distribution, a second cell region including a region having a luminance equal to or less than the prescribed luminance threshold value such that the second cell region is not restricted to the proximity of the peak position; and set, as an initial region, each of the first cell regions formed for all of the peak positions and cause the initial region to grow such that a region growing range is restricted to the formed second cell region.

11. The image processing device according to claim 10, wherein the background value is estimated from a bimodal Gaussian distribution fitted to the distribution of the pixel values.

12. The image processing device according to claim 1, wherein the processor is configured to calculate, as the feature value, a Laplacian of Gaussian (LoG) filter output value in response to the cell image.

13. The image processing device according to claim 1, wherein the processor is configured to delete the peak position the pixel value of which is equal to or less than a prescribed pixel threshold value.

14. The image processing device according to claim 1, wherein the processor is configured to set a range of the region peripheral to the peak position on the basis of the feature value of the peak position.

15. The image processing device according to claim 1, wherein the processor is configured to fill a hole generated in the formed cell region.

16. A cell recognition method comprising:

calculating a feature value, the feature value representing a likelihood of a pixel value in each of pixels in a cell image formed by capturing an image of a cell cluster composed of a plurality of cells being an extreme value;

detecting, as peak positions, pixel positions the feature value of which are greater than a prescribed feature value threshold value in the cell image and recording the detected peak positions;

forming, one at a time for the recorded peak positions, a cell region on the basis of a distribution of the pixel values of a plurality of pixels included in a region peripheral to the peak position in the cell image;

identifying a center position of the formed cell region;

determining, by using at least one of the peak position, a morphology of the cell region, and the center position of the cell region, a proximity state between the currently formed cell region and a previously formed cell region; and correcting, when it is determined that the proximity state is satisfied, at least one of the currently formed cell region and the previously formed cell region, wherein formation of the cell region and identification of the center position are performed concurrently on peak positions different from each other.

17. The cell recognition method according to claim 16, further including:

forming a first cell region on the basis of a luminance distribution such that the first cell region is restricted to a region that is proximate to the peak position and that has a luminance higher than a prescribed luminance threshold value;

forming, on the basis of the luminance distribution, a second cell region including a region having a luminance equal to or less than the prescribed luminance threshold value such that the second cell region is not restricted to the proximity of the peak position; and setting, as an initial region, each of the first cell regions formed for all of the peak positions and causing the initial region to grow such that a region growing range is restricted to the formed second cell region.

18. A non-transitory computer-readable medium having a cell recognition program stored thereon, the cell recognition program causing a computer to execute functions of:

calculating a feature value, the feature value representing a likelihood of a pixel value in each of pixels in a cell image formed by capturing an image of a cell cluster composed of a plurality of cells being an extreme value;

detecting, as peak positions, pixel positions the feature value of which are greater than a prescribed feature value threshold value in the cell image and recording the peak positions;

forming, one at a time for the recorded peak positions, a cell region on the basis of a distribution of the pixel values of a plurality of pixels included in a region peripheral to the peak position in the cell image;

identifying a center position of the formed cell region;

determining, by using at least one of the peak position, a morphology of the cell region, and the center position of the cell region, a proximity state between the currently formed cell region and a previously formed cell region; and correcting, when it is determined that the proximity state is satisfied, at least one of the currently formed cell region and the previously formed cell region, wherein formation of the cell region and identification of the center position are performed concurrently on peak positions different from each other.

19. The non-transitory computer-readable medium according to claim 18, wherein the cell recognition program further including functions of:

forming a first cell region on the basis of a luminance distribution such that the first cell region is restricted to a region that is proximate to the peak position and that has a luminance higher than a prescribed luminance threshold value;

forming, on the basis of the luminance distribution, a second cell region including a region having a luminance equal to or less than the prescribed luminance threshold value such that the second cell region is not restricted to the proximity of the peak position; and setting, as an initial region, each of the first cell regions formed for all of the peak positions and causing the initial region to grow such that a region growing range is restricted to the formed second cell region.

* * * * *